US006384957B1

(12) United States Patent
Ikeda et al.

(10) Patent No.: US 6,384,957 B1
(45) Date of Patent: May 7, 2002

(54) VARIABLE OPTICAL ATTENUATOR UTILIZING FARADAY EFFECT

(75) Inventors: Seiichi Ikeda; Nobuhiro Fukushima, both of Kawasaki; Hirohiko Sonoda, Sapporo, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/697,180

(22) Filed: Oct. 27, 2000

(30) Foreign Application Priority Data

Mar. 3, 2000 (JP) .......................................... 12-058815

(51) Int. Cl.[7] ................................................. G02F 1/09
(52) U.S. Cl. ......................... 359/280; 359/281; 359/283
(58) Field of Search .................................. 359/280, 281, 359/282, 283, 324, 246, 484; 372/27, 37

(56) References Cited

U.S. PATENT DOCUMENTS

| 5,812,304 | A |   | 9/1998 | Shirasaki et al. |
| 5,867,300 | A |   | 2/1999 | Onaka et al. |
| 5,889,609 | A |   | 3/1999 | Fukushima |
| 5,973,821 | A | * | 10/1999 | Onaka et al. ............... 359/283 |

FOREIGN PATENT DOCUMENTS

| JP | 61-35428 | 2/1986 |
| JP | 6-51255 | 2/1994 |

* cited by examiner

Primary Examiner—Hung Xuan Dang
Assistant Examiner—Tuyen Tra
(74) Attorney, Agent, or Firm—Staas & Halsey LLP

(57) ABSTRACT

The present invention aims at providing a variable optical attenuator to achieve the reduction of the wavelength-dependency of the entire device, by optimizing the magneto-optical system of the variable optical attenuator by deliberating the wavelength-dependency of Faraday rotation angles. To this end, the variable optical attenuator according to the present invention comprises: a Faraday rotator for providing a variable Faraday rotation angle; and a polarizer and an analyzer arranged in front of and behind the Faraday rotator, respectively, wherein the angle formed between the optical axis of the analyzer and the optical axis of the polarizer is set such that the Faraday rotation angle at which the wavelength-dependency of the optical attenuation amount of the variable optical attenuator becomes the maximum, is brought to be substantially 0°, to thereby reduce the wavelength-dependency of the optical attenuation amount at the aforementioned Faraday rotation angle.

10 Claims, 24 Drawing Sheets

VARIABLE OPTICAL ATTENUATOR UTILIZING FARADAY EFFECT

BACKGROUND OF THE INVENTION

(1) Field of the Invention

The present invention relates to an optical attenuator utilizing the Faraday effect to thereby obtain variable optical characteristics, and particularly relates to a variable optical attenuator to achieve the reduction of a wavelength-dependency of the optical characteristics of the variable optical attenuator, and to an optical transmission system utilizing such a variable optical attenuator.

(2) Related Art

As components of an optical transmission system, for example, there have been widely used variable optical attenuators utilizing the Faraday effect which is a kind of magneto-optical effect. Variable optical attenuators and the like utilizing the Faraday effect are used to keep output levels of optical amplifiers constant, such as in a system having the optical amplifiers. Generally, such a variable optical attenuator is characterized in that the rotation angle of a Faraday rotator is varied by changing such as an electric current applied to an electromagnet for the Faraday rotator, and an optical attenuation amount of the variable optical attenuator is determined corresponding to the setting of the rotation angle, resulting in a constitution free of mechanical movable portions.

Concrete constitutions of conventional variable optical attenuators utilizing the Faraday effect include those described in Japanese Unexamined Patent Publication Nos. 61-35428 and 6-51255.

Meanwhile, Faraday rotators applied to the aforementioned conventional variable optical attenuators physically possess wavelength-dependencies corresponding to Faraday rotation angles. Further, it is also known that a certain degree of wavelength-dependency is generated in an optical attenuation amount, in a constitution where Faraday rotation angles are variably controlled by a synthesized magnetic field formed of mutually orthogonal fixed magnetic field and variable magnetic field, such as in the conventional variable optical attenuator described in the aforementioned Japanese Unexamined Patent Publication No. 6-51255. As such, in the conventional variable optical attenuator, levels of output lights differ from one another corresponding to the wavelengths of the lights, due to respective wavelength-dependencies of a Faraday rotation angle and of an optical attenuation characteristic. For example, constituting a wavelength-division multiplexing (WDM) optical transmission system by utilizing such a conventional variable optical attenuator results in mutually different light levels for every wavelength channels, thereby undesirably causing a nonlinear effect on a transmission path.

SUMMARY OF THE INVENTION

The present invention has been carried out in view of the conventional problems as described above, and it is therefore an object of the present invention to provide a variable optical attenuator to achieve the reduction of a wavelength-dependency of the entire device, by optimizing the magneto-optical system of the variable optical attenuator by deliberating the wavelength-dependency of Faraday rotation angles and to provide an optical transmission system utilizing such a variable optical attenuator.

To achieve the above object, one aspect of a variable optical attenuator utilizing the Faraday effect the present invention, comprises: a Faraday rotator for providing polarized light transmitted through the Faraday rotator with a variable Faraday rotation angle; and elements for extracting linearly polarized light arranged on the light axis in front of and behind the Faraday rotator, respectively, in which an optical attenuation amount of the variable optical attenuator is changed by a variation of the Faraday rotation angle, wherein an angle formed between the optical axis of one of the elements for extracting the linearly polarized light and the optical axis of the other of the elements is set such that the Faraday rotation angle at which the wavelength-dependency of the optical attenuation amount of the variable optical attenuator becomes the maximum, is brought to be substantially 0°.

According to such a constitution, the angle formed between the optical axis of one of the elements for extracting the linearly polarized light and the optical axis of the other of the elements is set such that the Faraday rotation angle, at which the wavelength-dependency of the optical attenuation amount of the variable optical attenuator becomes the maximum, is brought to be substantially 0°, in consideration of such a tendency that as the Faraday rotation angle becomes smaller, the wavelength-dependency is reduced, in view of the Faraday rotation angle at which the wavelength-dependency of the optical attenuation amount of the variable optical attenuator becomes the maximum. This results in a reduced wavelength-dependency of the optical attenuation amount at the Faraday rotation angle brought to be substantially 0°.

In the aforementioned variable optical attenuator, it is preferable that the variable optical attenuator further comprises magnetic field generating means for applying a fixed magnetic field and a variable magnetic field, directions of which are mutually different, to the Faraday rotator, wherein the Faraday rotation angle is settable at 0°, by setting the directions of the fixed magnetic field and the variable magnetic field so as to include such a state that the direction of a synthesized magnetic field cooperatively formed by the fixed magnetic field and the variable magnetic field becomes perpendicular to the light direction. Concretely, when the direction of the fixed magnetic field is parallel to the light direction, the direction of the variable magnetic field may form an obtuse angle relative to the direction of the fixed magnetic field. Alternatively, when the direction of the fixed magnetic field is not parallel to the light direction, the direction of the variable magnetic field may form an obtuse angle relative to the light-directional component of the fixed magnetic field.

According to such constitutions, the light-directional component of the magnetization of the Faraday rotator becomes zero under the condition that the direction of the synthesized magnetic field cooperatively formed by the fixed magnetic field and the variable magnetic field becomes perpendicular to the light direction, to thereby allow realization of the Faraday rotation angle of 0°.

Another aspect of a variable optical attenuator utilizing the Faraday effect according to the present invention, comprises: two polarizers for extracting polarized light, respectively; a Faraday rotator disposed between the polarizers; a first magnet for applying, a magnetic field thereof parallel to an axis of light passing through the Faraday rotator, to the Faraday rotator; and a second magnet having a magnetic field direction forming an obtuse angle relative to the magnetic field of the first magnet, wherein the strength of the magnetic field of the second magnet is adjustable. Further, in the aforementioned variable optical attenuator, the constitution may be such that the direction of a synthesized magnetic field to be cooperatively formed by the magnetic fields of the first magnet and the second magnet can be brought to become perpendicular to the axis of light, by adjusting the strength of the magnetic field of the second magnet.

Further objects, features and advantages of the present invention will become more apparent from the following description of preferred embodiments when read in conjunction with the accompanying drawings.

BRIEF DESCRIPTION OF THE DRAWINGS

FIG. 1 is a view showing a magneto-optical system of a common variable optical attenuator, in which FIG. 1A is a top view and FIG. 1B is a side view;

FIG. 7 is a view showing a magneto-optical system of a variable optical attenuator according to an embodiment of the present invention, in which

DETAILED DESCRIPTION OF THE PREFERRED EMBODIMENT

There will be firstly briefed a basic constitution and an operation principle of a common variable optical attenuator utilizing the Faraday effect.

Figure 1:
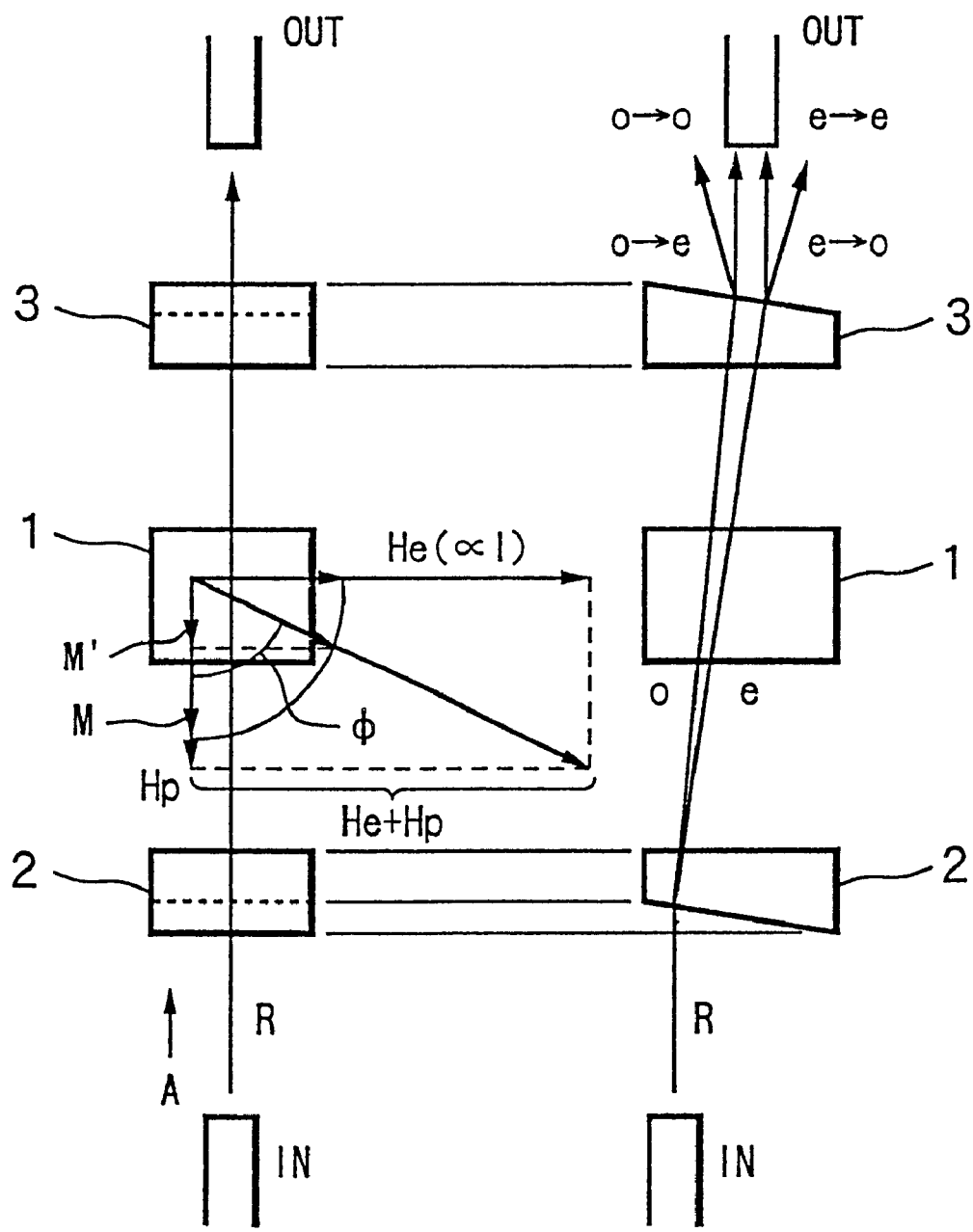

FIG. 1 is a view showing a magneto-optical system of a common variable optical attenuator, in which FIG. 1A is a top view and FIG. 1B is a side view. FIG. 1B also shows a result of ray tracing.

As shown in FIG. 1, the common variable optical attenuator includes a polarizer 2 as an element for extracting linearly polarized light, a Faraday rotator 1, and an analyzer 3, arranged in this order along the light direction of the incident light. Further, the Faraday rotator 1 is applied with a fixed magnetic field Hp parallel to the light direction and a variable magnetic field He perpendicular to the light direction, as shown in FIG. 1A. This fixed magnetic field Hp is generated such as by a permanent magnet (first magnet) to be described later, and provides a magnetic field sufficient to saturate the magnetization of the Faraday rotator (its saturation magnetization is supposed to be M). Further, the variable magnetic field He is generated such as by an electromagnet (second magnet) to be described later, and becomes variable by changing an electric current I to be applied to the electromagnet. Thus, the magnetic field Hp+He obtained by synthesizing the fixed magnetic field Hp and variable magnetic field He has a variable magnitude and a variable orientation, corresponding to the magnitude of the applied electric current I.

The Faraday rotation angle by the Faraday rotator is determined by the strength of the magnetic field applied thereto, and by the angle of the magnetic field relative to the incident light. Further, the strength of the light-directional magnetization component or strength M' of the Faraday rotator is changed by varying the magnetic field He perpendicular to the light to thereby vary the angle of the synthesized magnetic field Hp+He relative to the light, since the magnetization of the Faraday rotator has been saturated by the magnetic field Hp parallel to the light. Change of the strength of the light-directional magnetization component M' allows varying the Faraday rotation.

In the variable optical attenuator having the aforementioned basic constitution, rays R emitted from an input optical fiber IN are separated into ordinary rays o and extraordinary rays e by the polarizer 2 (such as a wedge-shaped rutile) according to its wedge angle, as shown by the ray tracing of FIG. 1B. The separated ordinary rays o and extraordinary rays e undergo Faraday rotations proportional to the magnitude of the light-directional magnetization component M' at the Faraday rotator 1, respectively, and then input into the analyzer 3 (such as another wedge-shaped rutile). Here, the optical axis (which will be described in detail later) of the analyzer 3 is arranged to be substantially parallel to the Faraday rotation angle where the applied electric current I is substantially zero, so that, among the ordinary rays o at the polarizer 2, those components (o→o components) corresponding to ordinary rays also at the analyzer 3, are coupled to an output optical fiber OUT. Similarly, among the extraordinary rays e at the polarizer 2, those components (e→e components) corresponding to extraordinary rays also at the analyzer 3, are coupled to the output optical fiber OUT. Further, it is possible that, for the ordinary rays o and extraordinary rays e at the polarizer 2, those ratios between the ordinary ray components and extraordinary ray components to be separated at the analyzer 3, respectively, can be set to required values, since the Faraday rotation angles are variable corresponding to the magnitude of the variable magnetic field He. Namely, since the aforementioned ratios are variable corresponding to the Faraday rotation angles, it becomes possible to change the light amount to be coupled to the output optical fiber OUT, thereby realizing an intended function as the variable optical attenuator.

There will be now explained a relationship between the optical axes of the polarizer 2 and analyzer 3.

Figure 2:
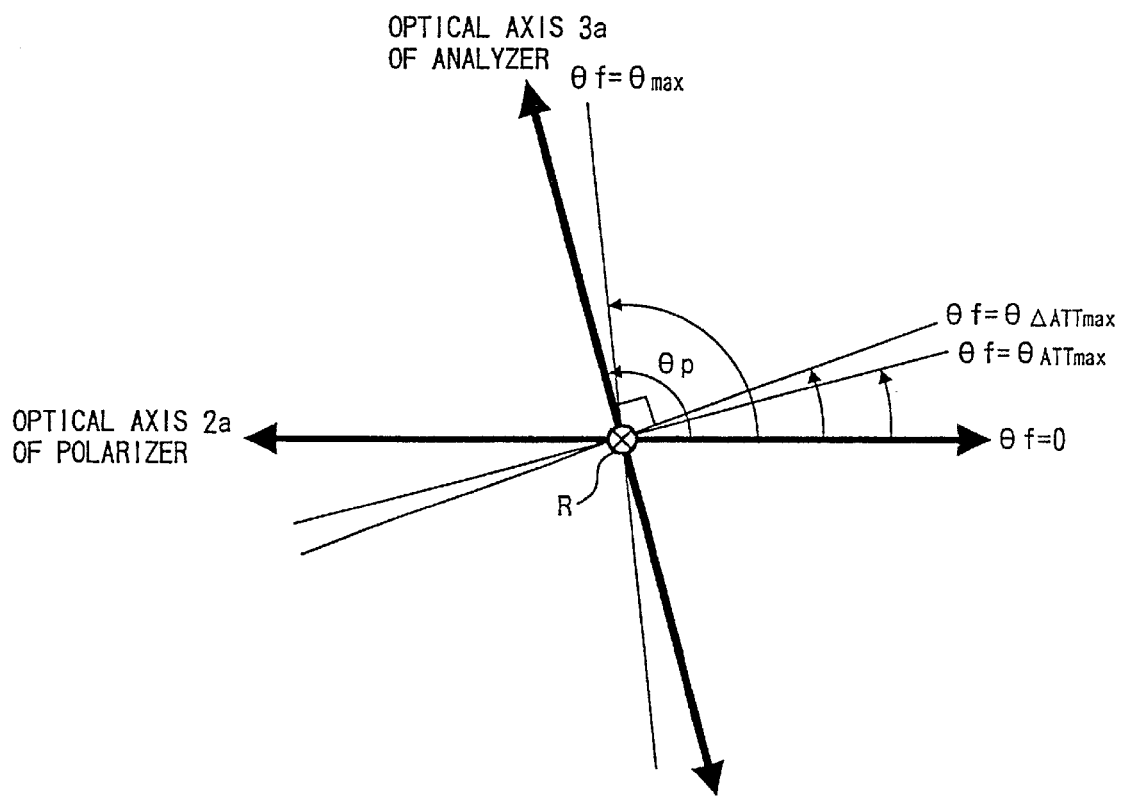
FIG. 2 is a view showing a relationship between optical axes of a polarizer and an analyzer in a common variable optical attenuator.

FIG. 2 is a view showing a general relationship between such optical axes. Note, these optical axes are viewed from a direction of an arrow A in FIG. 1. Further, the depicted angles are represented with reference to the optical axis of the polarizer 2 as a reference (0°), while assuming that the counter-clockwise direction is positive.

As described above, the input rays R are transmitted through the polarizer 2 and separated thereby into extraordinary rays e and ordinary rays o having polarization planes parallel to and perpendicular to the optical axis of the polarizer 2, respectively. In the following description, there will be concretely considered the motion of the polarization concerning the extraordinary rays e among the separated rays. Note, the description of the ordinary rays o is omitted herein, since these ordinary rays o are perpendicular to the extraordinary rays e so that the motion of these ordinary rays o will be understood by assuming a situation rotated by 90° concerning the explanation to be described hereinafter.

Those extraordinary rays e transmitted through the polarizer 2 are further transmitted through the Faraday rotator 1 at which these extraordinary rays e undergo a required Faraday rotation corresponding to the magnitude of the variable magnetic field He. For example, when the electric current I applied to the electromagnet is set to be zero so that substantially no variable magnetic fields He are generated, only the fixed magnetic field Hp by the permanent magnet exists. Thus, the light-directional magnetization component M' of the Faraday rotator 1 becomes equal to the saturation magnetization M, to thereby provide the maximum value $\theta_{max}$ as the Faraday rotation angle $\theta f$. Among the rays subjected to the Faraday rotation of the maximum value $\theta_{max}$, only those components parallel to the optical axis of the analyzer 3 become extraordinary ray components at the analyzer 3 and are coupled to the output optical fiber OUT. The loss caused at this time (where $\theta f=\theta_{max}$, and I=0) is regarded as the insertion loss of the entire variable optical attenuator, since the coupling efficiency to the output optical fiber OUT becomes the best under this condition.

Next, as the electric current I is changed to increase the variable magnetic field He, the light-directional magnetization component M' of the Faraday rotator 1 is decreased to thereby decrease the Faraday rotation angle $\theta f$. As a result, the optical components of the Faraday rotated rays are reduced in the optical axis of the analyzer 3 such that the coupling efficiency to the output optical fiber OUT is reduced, resulting in observation of variable optical attenuation. Further, if the Faraday rotation angle $\theta f$ is brought to a position perpendicular to the optical axis of the analyzer 3, the optical components of the Faraday rotated rays become 0 (zero) in the optical axis of the analyzer 3 to thereby provide the maximum optical attenuation amount. The Faraday rotation angle $\theta f$ at this time is supposed to be $\theta_{ATTmax}$. Then, there can be established a relationship of $\theta_{ATTmax}=\theta p-90°$, assuming that the angle defined between the optical axis 3a of the analyzer 3 and the optical axis 2a of the polarizer 2 in the rotational direction (counter-clockwise direction in FIG. 2) by the Faraday rotator 1 is $\theta p$.

Based on the above, the optical attenuation amount ATT as the variable optical attenuator can be formulated by the relationship represented by the following equation (1):

$$\text{ATT [dB]}=-10\cdot\log_{10}[\cos^2(\theta p-\theta f)+10^{(-ER/10)}] \quad (1),$$

wherein ER is an extinction ratio of an optical crystal to be used as the Faraday rotator 1, and represents the maximum value in variable optical attenuation.

There will be described hereinafter a cause of generation of the wavelength-dependency in the conventional variable optical attenuator as mentioned above.

Figure 3:
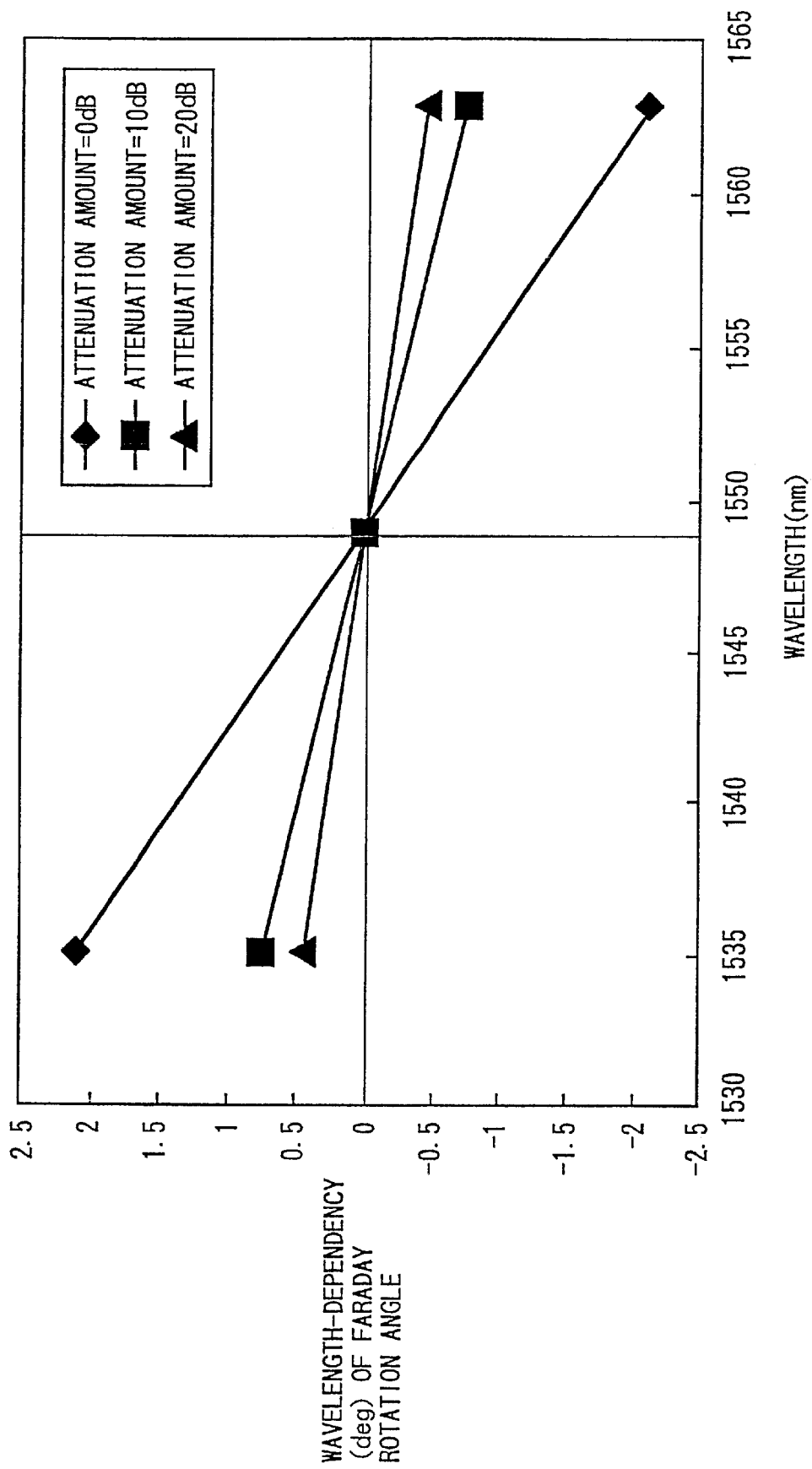
FIG. 3 is a graph for explaining wavelength-dependencies of Faraday rotation angles in a common variable optical attenuator.

FIG. 3 is a graph for explaining wavelength-dependencies of Faraday rotation angles.

In FIG. 3, the abscissa represents a wavelength of incident light. Further, when the Faraday rotation angle $\theta f$ such as at the wavelength of 1549 nm is a reference, as a value representing a wavelength-dependency, the ordinate represents deviations of Faraday rotation angles at other wavelengths. When the optical attenuation amount is set at substantially 0 dB in the aforementioned variable optical attenuator, i.e., when the Faraday rotation angle $\theta f$ is set at the maximum value $\theta_{max}$, deviations of the Faraday rotation angle $\theta f$ within the wavelength range between 1535 nm and 1563 nm exceed +2°, thereby showing a larger wavelength-dependency. The wavelength-dependency of the Faraday rotation angle $\theta f$ tends to become smaller, as the optical attenuation amount is increased by 10 dB, 20 dB and so forth, i.e., as the Faraday rotation angle $\theta f$ is decreased. Concretely, when the optical attenuation amount is set at 20 dB, deviations of the Faraday rotation angle θf within the wavelength range of 1535 to 1563 nm become smaller than +0.5°, thereby showing a reduced wavelength-dependency.

Figure 4:
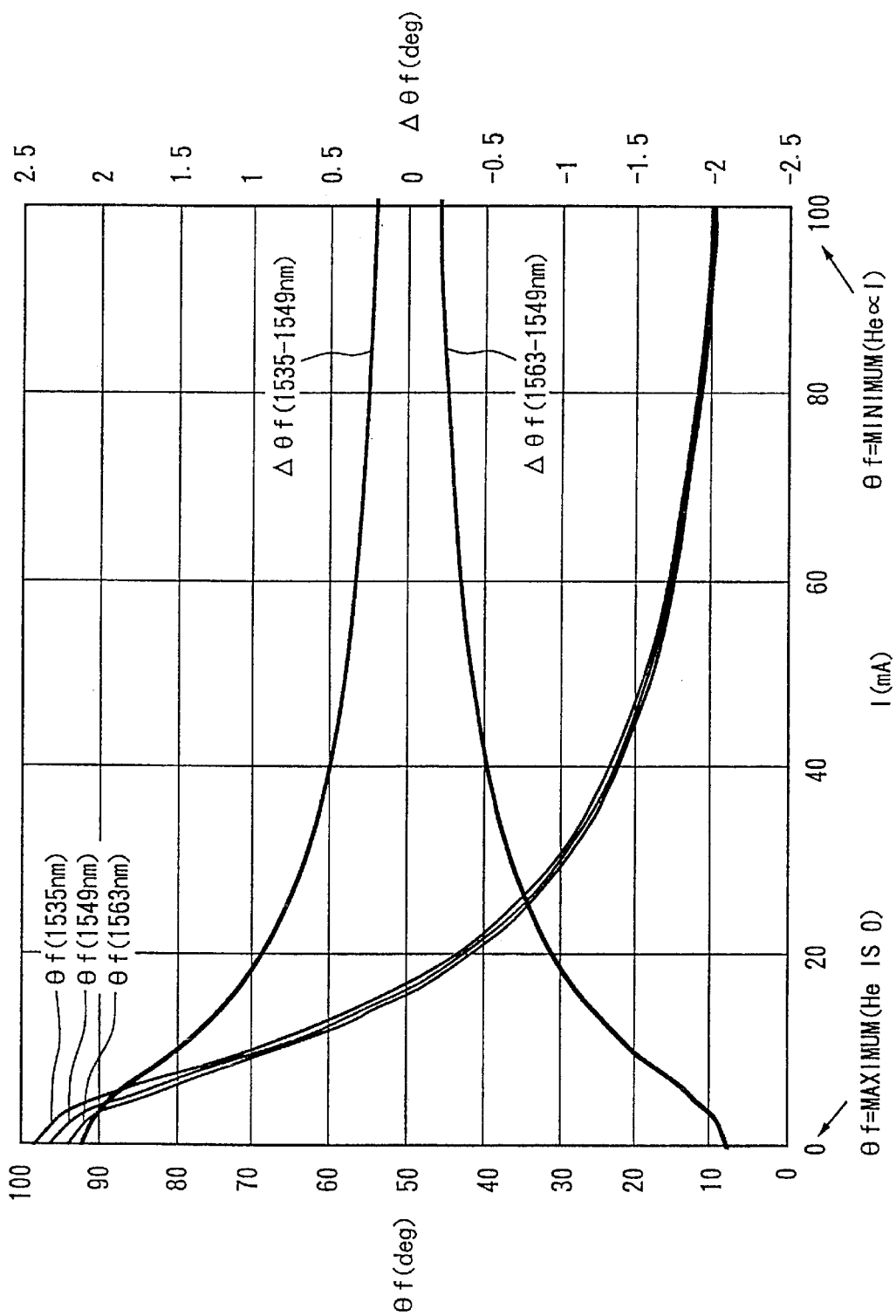
FIG. 4 is a graph showing a calculational result of a relationship between a Faraday rotation angle and an applied electric current in a common variable optical attenuator.

Based on the aforementioned wavelength-dependencies of Faraday rotation angles, if a relationship between a Faraday rotation angle θf and an applied electric current I in a common variable optical attenuator is calculated, then there can be seen the characteristics as shown in the graph of FIG. 4. In this graph, the abscissa represents an applied electric current 1, the left side ordinate represents a Faraday rotation angle θf, and the right side ordinate represents a wavelength-dependency Δθf of a Faraday rotation angle (i.e., when the Faraday rotation angle θf at the wavelength of 1549 nm is a reference, deviations of Faraday rotation angles at other wavelengths). It is further assumed that the angle θp to be formed between the polarizer 2 and analyzer 3 is set at 105°, for example.

As seen from FIG. 4, the smaller the applied electric current 1, the larger the wavelength-dependencies Δθf of Faraday rotation angles. This is because Faraday rotation angles θf become large when the applied electric current I is small, thereby exhibiting a characteristic similar to the aforementioned relationship shown in FIG. 3.

Figure 5:
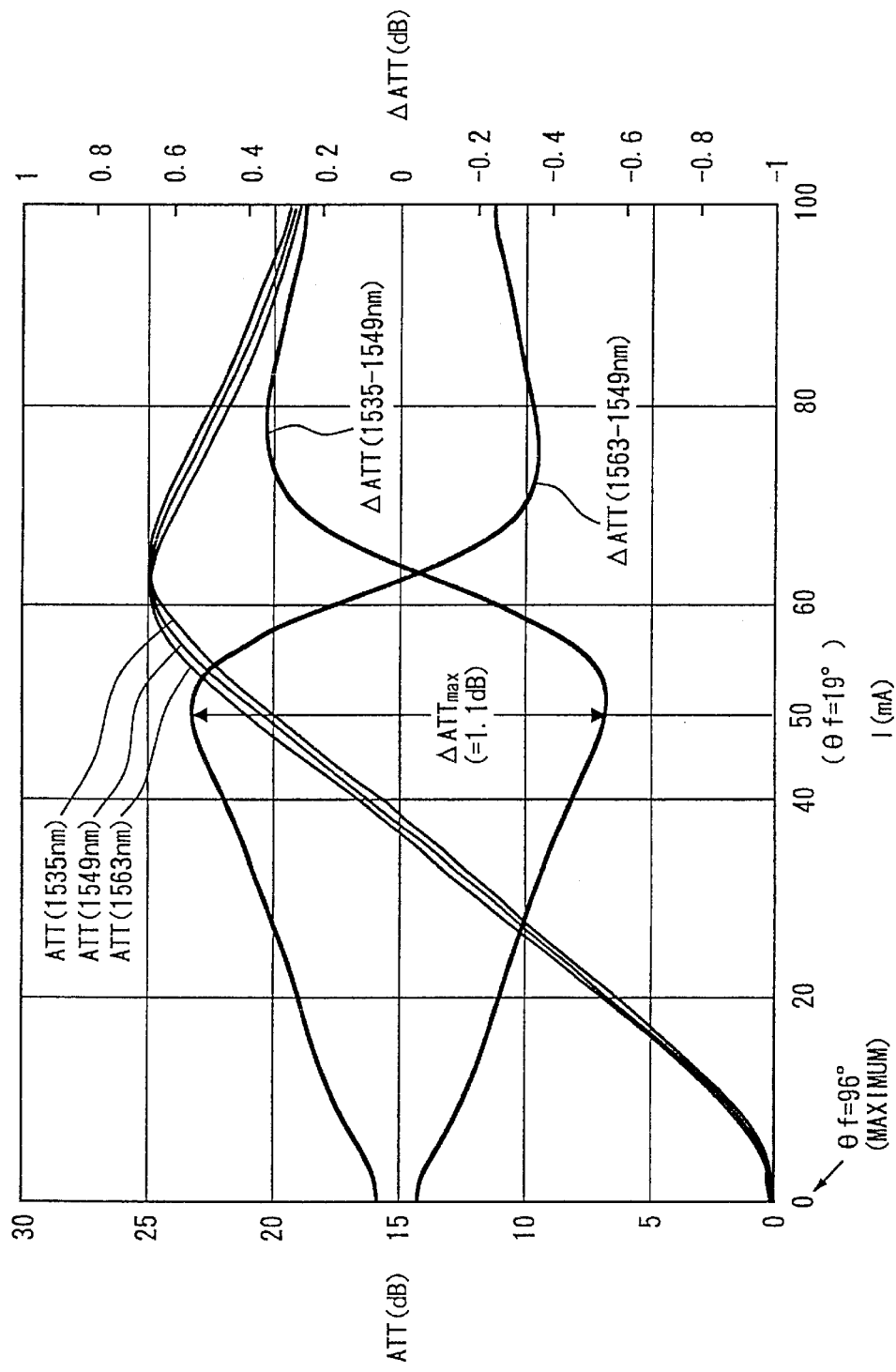
FIG. 5 is a graph showing a calculational result between an optical attenuation amount and the applied electric current, corresponding to FIG. 4.

Further, by utilizing the aforementioned equation (1), there can be calculated a relationship between the optical attenuation amount ATT and the applied electric current I corresponding to FIG. 4, to thereby provide the characteristic shown in the graph of FIG. 5. Note, the abscissa of this graph represents an applied electric current 1, the left side ordinate represents an optical attenuation amount ATT, and the right side ordinate represents a wavelength-dependency ΔATT of an optical attenuation amount (i.e., when the optical attenuation amount ATT at the wavelength of 1549 nm is a reference, deviations of optical attenuation amounts at other wavelengths). Further, the calculation is conducted herein by setting the maximum value of the optical attenuation amount ATT (the value of ER in the aforementioned equation (1)) at 25 dB.

As seen from FIG. 5, the wavelength-dependencies ΔATT of the optical attenuation amount become largest when the applied electric current I is set at approximately 50 mA. Concretely, in this case, the optical attenuation amount ATT becomes approximately 21.2 dB and the wavelength-dependency ΔATT throughout the range of 1535 to 1563 nm becomes as large as approximately 1.1 dB. Note, when the applied electric current I is set at approximately 50 mA, Faraday rotation angles θf become approximately 19°, as seen from FIG. 4. The cause of generation of the aforementioned wavelength-dependency ΔATT of the optical attenuation amount can be explained, as follows.

Figure 6:
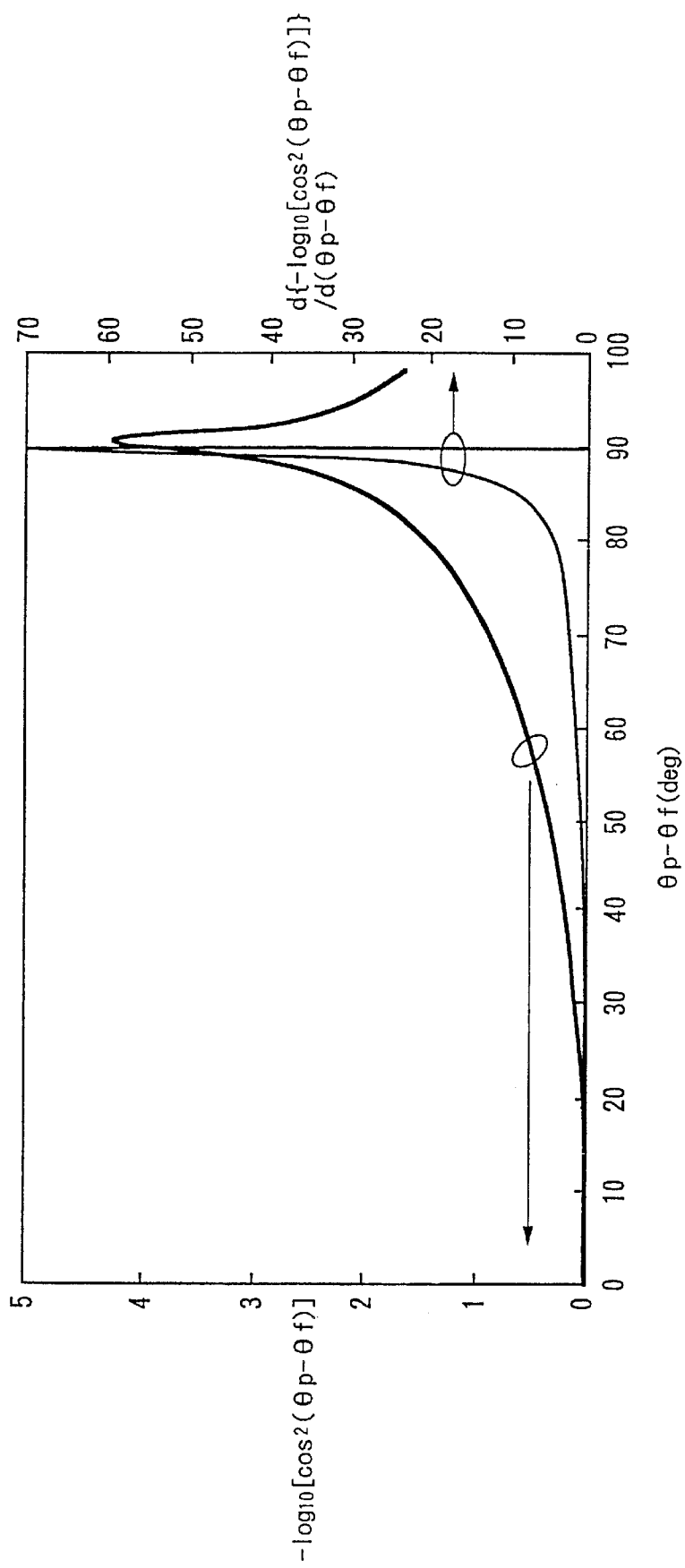
FIG. 6 is a graph explaining a cause of generation of a wavelength-dependency of an optical attenuation amount in a common variable optical attenuator.

As seen from the equation (1), the optical attenuation amount ATT includes a term of log[cos²(θp−θf)]. FIG. 6 shows the relationship between this term and (θp−θf), as well as a differential coefficient of the term. Namely, when the Faraday rotation angle θf is large (i.e., θp−θf is small), the differential coefficient of the term of log[cos²(θp−θf)] is extremely small. In other words, this means that the term of log[cos²(θp−θf)] is not substantially affected even when the Faraday rotation angle θf is changed due to the wavelength-dependency of the Faraday rotation.

Contrary, when the Faraday rotation angle θf is small (i.e., θp−θf is large), the differential coefficient of the term log[cos²(θp−θf)] becomes extremely large (particularly, this differential coefficient steeply rises up when the value of θp−θf exceeds 85°), also resulting in a larger variation of the term of log[cos²(θp−θf)]. As such, there is exhibited the wavelength-dependency ΔATT of the optical attenuation amount such as shown in FIG. 5. Note, the wavelength-dependencies ΔATT exceptionally become substantially zero near the maximum optical attenuation amount ER (near l=62 mA in FIG. 5) to be determined by the extinction ratio of the optical crystal, where the optical attenuation amount ATT reaches the highest limit.

It is very important here to note that: although the wavelength-dependency ΔATT of the optical attenuation amount is caused by the wavelength-dependency of the Faraday rotator 1 itself, this wavelength-dependency ΔATT of the optical attenuation amount does not necessarily become the maximum when the wavelength-dependency Δθf of the Faraday rotation angle is at the maximum.

The present invention therefore enables realization of a variable optical attenuator having a reduced wavelength-dependency, by optimizing the magneto-optical system of the variable optical attenuator having the aforementioned common basic constitution, in view of the wavelength-dependencies Δθf, ΔATT of Faraday rotation angles and optical attenuation amounts.

Concretely, in the variable optical attenuator having the magneto-optical system as shown in FIG. 1 and FIG. 2, the wavelength-dependency ΔATT of the optical attenuation amount becomes the maximum when the Faraday rotation angle θf is substantially 190 as shown in FIG. 4 and FIG. 5. Meanwhile, as seen from FIG. 3, sufficiently small Faraday rotation angles θf lead to smaller wavelength-dependencies Δθf of Faraday rotation angles. Namely, wavelength-dependencies ΔATT of optical attenuation amount can be reduced, by optimizing the relationship (angle θp to be formed) between the optical axis 2a of the polarizer 2 and the optical axis 3a of the analyzer 3, such that the Faraday rotation angle θf, where the wavelength-dependency ΔATT of the optical attenuation amount becomes the maximum, is shifted to a region in which the wavelength-dependency Δθf of the Faraday rotation angle is small (i.e., such that the Faraday rotation angle θf, where the wavelength-dependency ΔATT of the optical attenuation amount becomes the maximum, approaches 0°).

However, in the magneto-optical system as shown in FIG. 1 and FIG. 2, it is impossible to reduce the Faraday rotation angle θ$_{ΔATTmax}$, at which the wavelength-dependency ΔATT of the optical attenuation amount becomes the maximum, down to substantially 0°. This is because, in order to reduce the Faraday rotation angle θf down to substantially 0°, it is necessary to increase the magnitude of the variable magnetic field He to infinity, since the fixed magnetic field Hp and the variable magnetic field He are perpendicular to each other in the common basic constitution as shown in FIG. 1, however, this can be never done, since the magnitude of the variable magnetic field He is finite. Thus, the present invention contemplates further reducing the wavelength-dependency ΔATT of the optical attenuation amount, by optimizing the respective directions of the fixed magnetic field Hp and variable magnetic field He relative to the light direction.

There will be now described an embodiment of a variable optical attenuator according to the present invention with reference to the accompanying drawings.

Figures 7A, 7B:
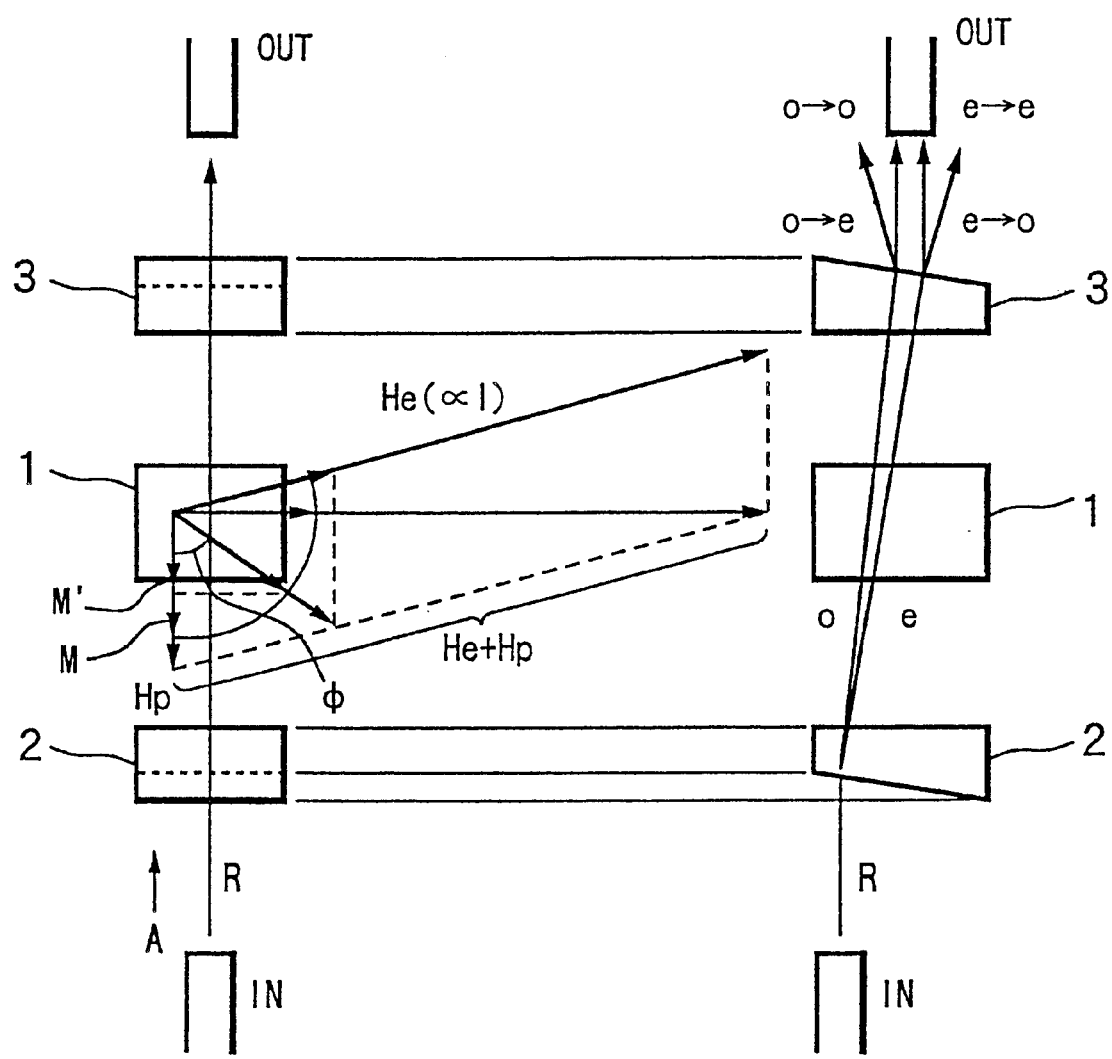
FIG. 7A is a top view and FIG. 7B is a side view.

FIG. 7 is a view showing a magneto-optical system of a variable optical attenuator according to an embodiment of the present invention, in which FIG. 7A is a top view and FIG. 7B is a side view.

As shown in FIG. 7, this variable optical attenuator comprises its magneto-optical system including a polarizer 2, a Faraday rotator 1 and an analyzer 3 arranged in this order along the transmitting direction of rays R emitted from an input optical fiber IN, similarly to the common basic constitution shown in FIG. 1. However, the variable optical attenuator of this embodiment has a positional relationship of the optical axes of the polarizer and analyzer relative to the light direction, and directions of the fixed magnetic field Hp and variable magnetic field He to be applied to the Faraday rotator 1, in a manner different from the aforementioned common basic constitution.

The Faraday rotator 1 is a magneto-optical crystal having the Faraday effect as one of magneto-optical effects. As this type of magneto-optical crystal, there are known $(RBi)_3(FeM)_5O_{12}$ or $(RBi)_3Fe_5O_{12}$ (wherein R is one or more elements selected from rare earth elements including yttrium, and M is one or more elements substitutable for iron) made by liquid phase epitaxial method, and a typical composition of $Tb_{1.00}Y_{0.65}Bi_{1.35}Fe_{4.05}Ga_{0.95}O_{12}$. Further, the magneto-optical crystal may be a garnet single crystal having a composition of $Y_3Fe_5O_{12}$.

The polarizer 2 and analyzer 3 are formed such as of wedge-shaped rutiles, respectively, and have optical axes thereof arranged to have the following positional relationship.

Figure 8:
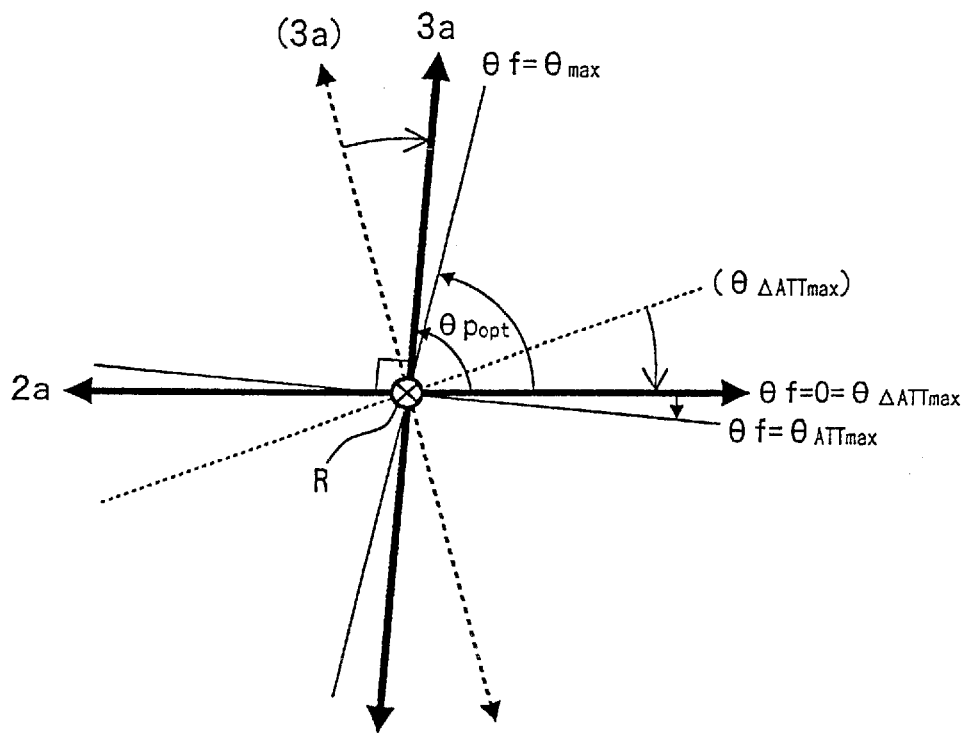
FIG. 8 is a view showing a relationship between optical axes of a polarizer and an analyzer in the variable optical attenuator of the embodiment of the present invention.

FIG. 8 is a view showing a relationship between optical axes of the polarizer 2 and analyzer 3 in this variable optical attenuator. Similarly to FIG. 2, these optical axes are viewed from a direction of an arrow A in FIG. 7A. Further, the depicted angles are represented with the optical axis of the polarizer 2 as a reference (0°), while assuming that the counter-clockwise direction is positive.

In this variable optical attenuator shown in FIG. 8, the arrangement of an optical axis 3a of the analyzer 3 relative to an optical axis 2a of the polarizer 2 is determined such that the Faraday rotation angle $\theta_{\Delta ATTmax}$, at which the wavelength-dependency of the optical attenuation amount becomes the maximum, coincides with substantially 0°. Concretely, in FIG. 8, the dashed line representing the Faraday rotation angle ($\theta_{\Delta ATTmax}$), at which the wavelength-dependency of the optical attenuation amount becomes the maximum, is rendered to substantially coincide with the optical axis 2a of the polarizer 2, by rotating the optical axis (3a) of the analyzer of the common basic constitution (corresponding reference numerals are bracketed) represented by the dashed line, in the direction approaching the optical axis 2a of the polarizer, i.e., in the direction reducing the formed angle θp. The angle θp to be formed between the optical axis 2a and optical axis 3a at this time is referred to as an optimized angle $\theta p_{opt}$.

It is noted that, depending on the setting of parameters of this variable optical attenuator, the wavelength-dependency of the optical attenuation amount may not become the minimum even when the angle θp is optimized such that the Faraday rotation angle $\theta_{ATTmax}$, at which the wavelength-dependency of the optical attenuation amount of the common basic constitution becomes the maximum, is brought to be substantially 0°. In such a situation, it is desirable to optimize the angle $\theta p_{opt}$ such that the total wavelength-dependency of the optical attenuation amount becomes the minimum.

As the optical axis 3a of the analyzer 3 is shifted in the aforementioned manner, there are also reduced the maximum value $\theta_{max}$ of the Faraday rotation angle and the Faraday rotation angle $\theta_{ATTmax}$ at which the optical attenuation amount becomes the maximum. In the example of FIG. 8, the Faraday rotation angle $\theta_{ATTmax}$, at which the optical attenuation amount becomes the maximum, is positioned in the negative area. To realize variable control of such a Faraday rotation angle θf, it is necessary to duly define the condition of the magnetic field to be applied to the Faraday rotator 1.

Figure 9:
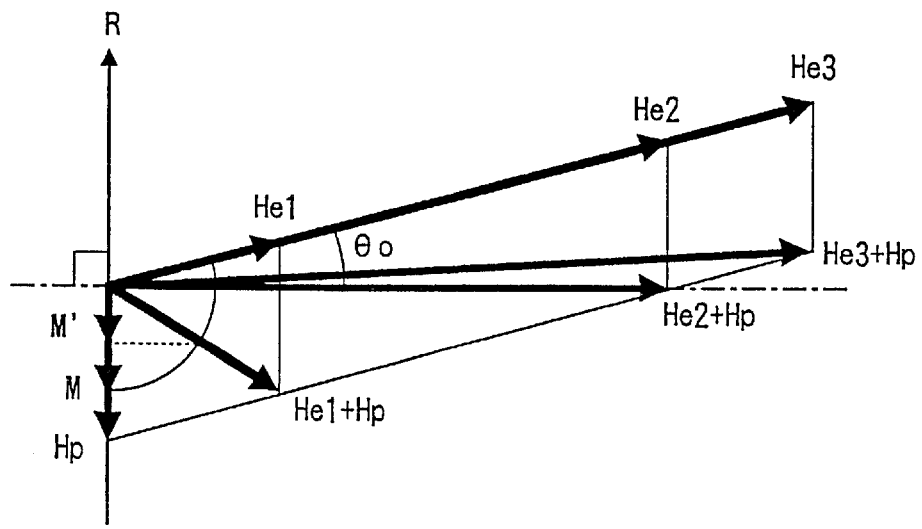
FIG. 9 is a view showing a relationship among a light direction, fixed magnetic field and variable magnetic field, in the embodiment of the present invention.

FIG. 9 is a view showing a relationship among the light direction R, fixed magnetic field Hp and variable magnetic field He in the variable optical attenuator of FIG. 7. The thus depicted relationship corresponds to the concrete relationship among magnetic fields shown in FIG. 7A.

As shown in FIG. 9, it is assumed in this variable optical attenuator, for example, that the fixed magnetic field Hp is provided parallelly to the light direction R, and the variable magnetic field He has an angle of 90+θo° (θo>0) relative to the light direction R. Concrete value of the angle θo may be 15°, for example. However, the value of the angle θo is not limited thereto, and can be set at an arbitrary angle greater than 0°.

When the vector of a synthesized magnetic field He+Hp to be formed by the aforementioned fixed magnetic field Hp and variable magnetic field He is rendered to be perpendicular to the light direction R, the light-directional magnetization component M' becomes 0 (M'=0) to thereby realize that the Faraday rotation angle θf=0°, so that the wavelength-dependency Δθf of the Faraday rotation becomes 0 (Δθf=0).

Concretely explaining corresponding to the magnitude change of the variable magnetic field He, only the fixed magnetic field Hp is applied to the Faraday rotator 1 when the magnitude of the variable magnetic field He is 0, to thereby provide the maximum Faraday rotation angle $\theta_{max}$ based on the saturation magnetization M parallel to the light axis. When the magnitude of the variable magnetic field He is increased to He1, the Faraday rotator 1 is applied with a synthesized magnetic field of He1+Hp, to thereby provide a positive Faraday rotation angle θf ($<\theta_{max}$) corresponding to the light-directional magnetization component M' (>0) of the magnetization M. When the magnitude of the variable magnetic field He is further increased to He2, the Faraday rotator 1 is applied with a synthesized magnetic field of He2+Hp perpendicular to the light axis, to thereby bring the light-directional magnetization component M' of the magnetization M to be zero so that the Faraday rotation angle θf is also brought to be 0. Under this situation of the variable magnetic field He2, the wavelength-dependency Δθf of the Faraday rotation angle becomes the minimum. When the magnitude of the variable magnetic field He is further increased to He3, the Faraday rotator 1 is applied with a synthesized magnetic field of He3+Hp, to thereby provide a negative Faraday rotation angle θf corresponding to the light-directional magnetization component M' (<0) of the magnetization M. Herein, the maximum optical attenuation amount is realized in the range where the Faraday rotation angle θf becomes negative as shown in FIG. 8.

There will be now briefly explained a constitution of magnetic field generating means for applying the aforementioned fixed magnetic field Hp and variable magnetic field He to the Faraday rotator 1.

Figure 10:
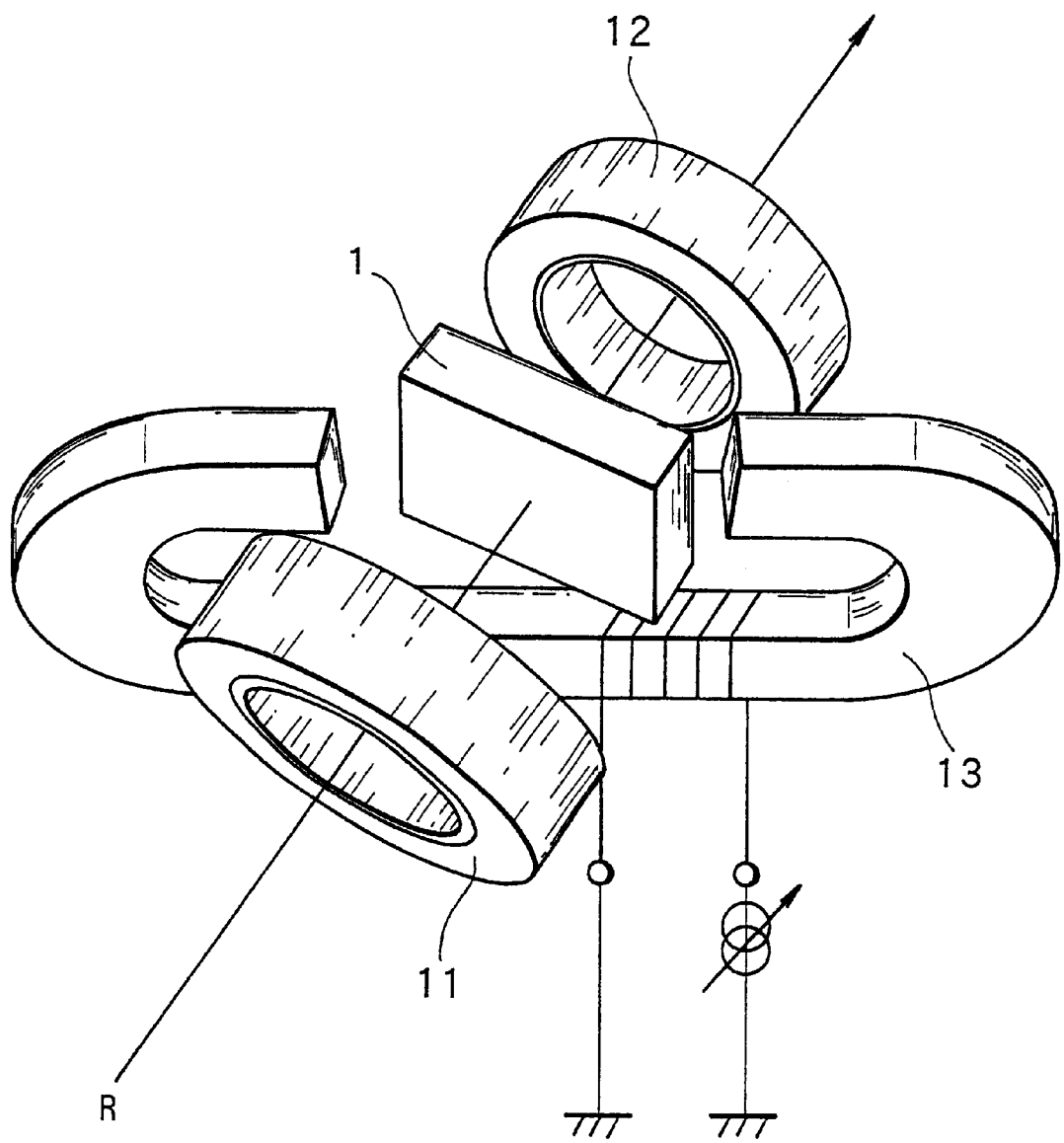
FIG. 10 is a perspective view showing a concrete constitutional example for applying a magnetic field to a Faraday rotator in the embodiment of the present invention.

FIG. 10 is a perspective view showing a concrete constitutional example for applying a magnetic field to the Faraday rotator 1 in this variable optical attenuator.

In the constitutional example of FIG. 10, annular permanent magnets 11, 12 are arranged on the light axis in front of and behind the Faraday rotator 1, respectively, such that the polarities of these magnets are aligned to generate the fixed magnetic field Hp. There is further arranged a yoke of an electromagnet 13 so as to interpose the Faraday rotator 1 between two arms thereof. The variable magnetic field He is generated at a required magnitude corresponding to the electric current I to be applied to the electromagnet 13.

In the variable optical attenuator having the aforementioned constitution, the applied electric current I to the electromagnet 13 is variably controlled based on the aforementioned operation principle, so as to adjust the Faraday rotation angle θf to thereby control the light amount to be coupled to the output optical fiber OUT. At this time, the wavelength-dependency ΔATT of the optical attenuation amount in the variable optical attenuator of the present invention is remarkably reduced, since the magneto-optical system of this variable optical attenuator has been optimized in view of the wavelength-dependency of the Faraday rotation angle as described above.

Figure 11:
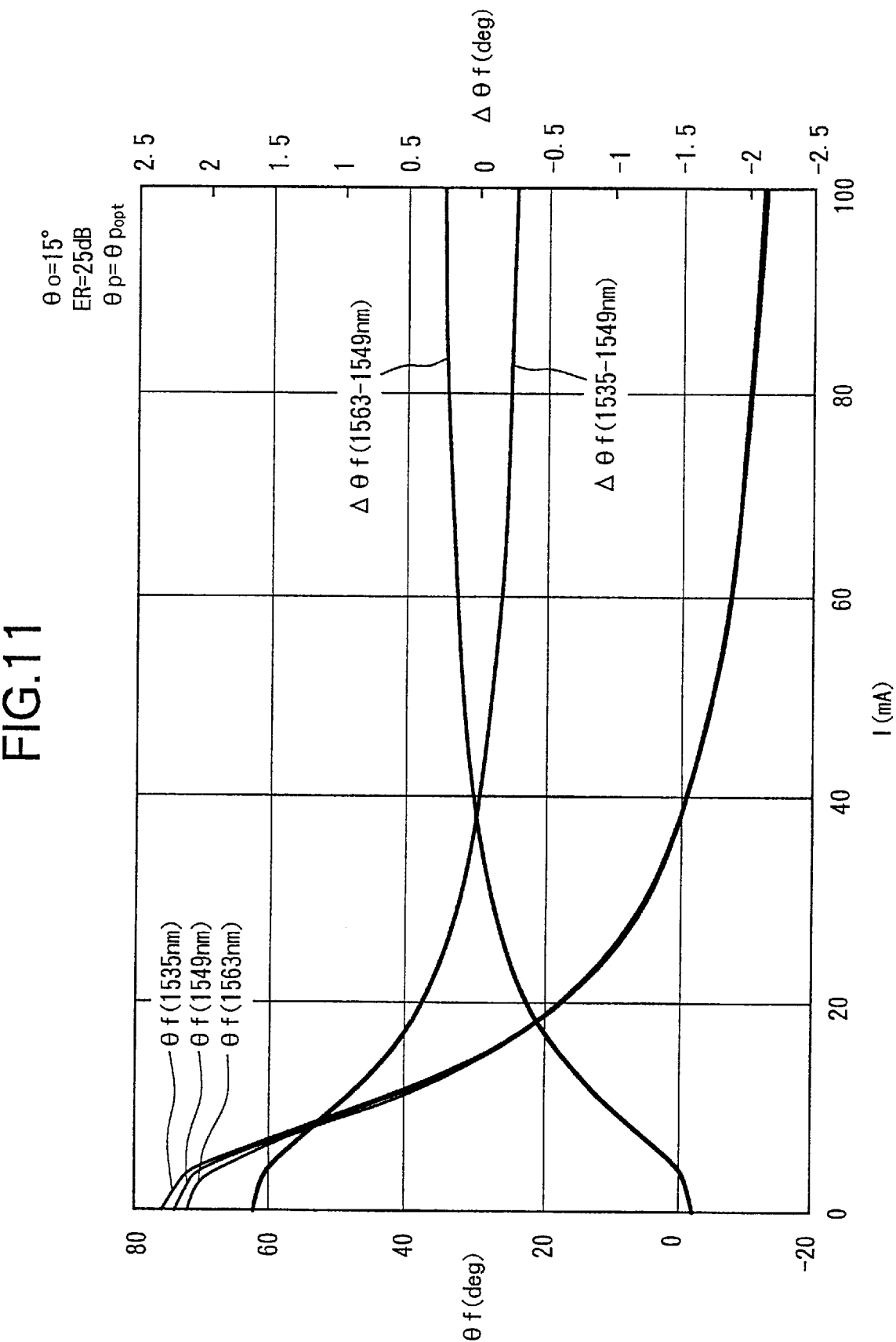
FIG. 11 is a graph showing a calculational result of a relationship between a Faraday rotation angle and an applied electric current in the embodiment of the present invention.
Figure 12:
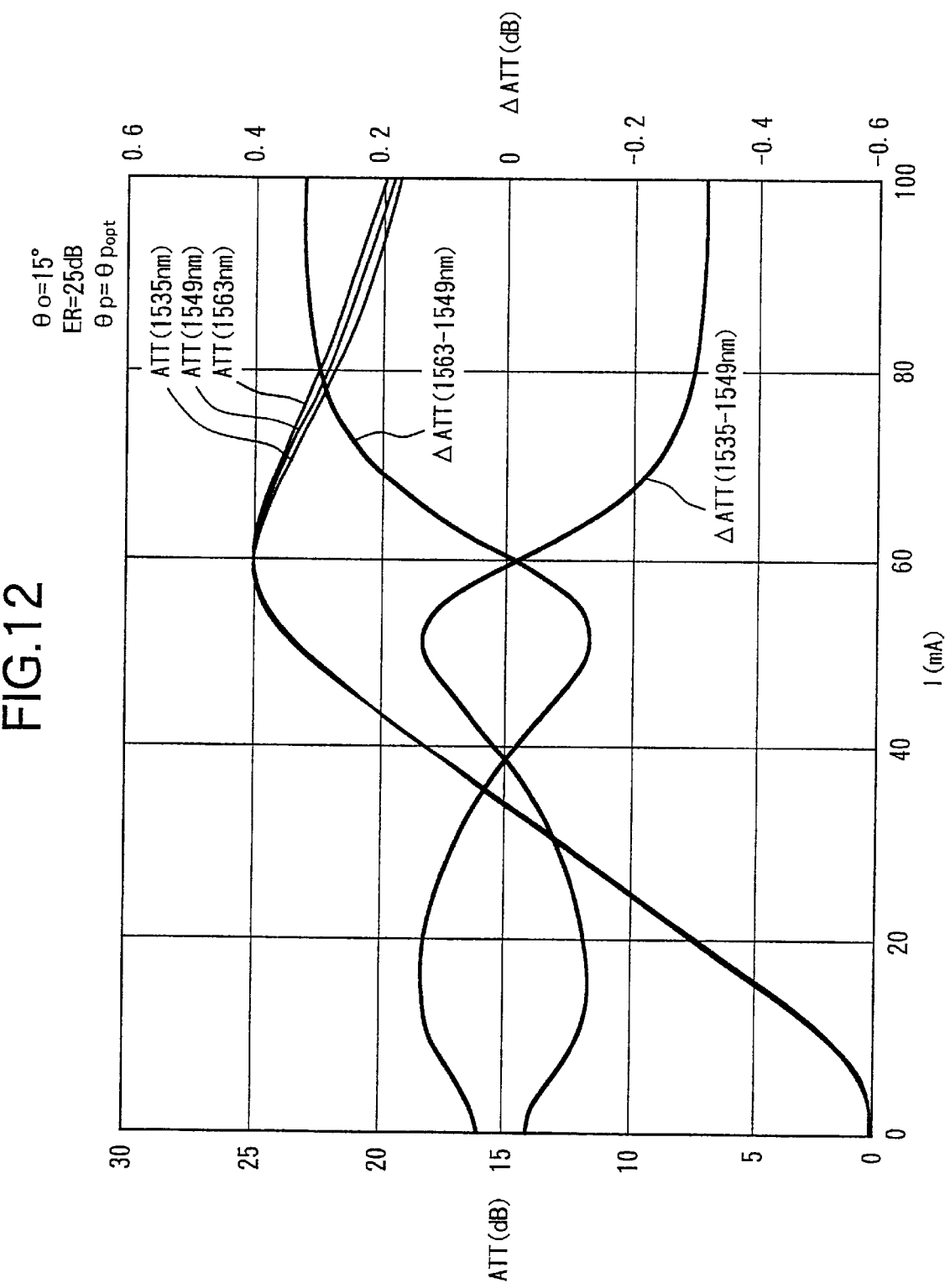
FIG. 12 is a graph showing a calculational result of a relationship between an optical attenuation amount and the applied electric current, corresponding to FIG. 11.

FIG. 11 is a graph showing a calculational result of a relationship between the Faraday rotation angle θf and the applied electric current I in the variable optical attenuator of this embodiment. Further, FIG. 12 is a graph showing a calculational result of a relationship between the optical attenuation amount ATT and the applied electric current 1, corresponding to FIG. 11, making use of the aforementioned equation (1). Note, those values represented by the abscissa and ordinates in FIG. 11 correspond to those in FIG. 4, while those values represented by the abscissa and ordinates in FIG. 12 correspond to those in FIG. 5.

In calculating the relationships shown in the respective figures, the angle θo is set at 15°, for example, so that the variable magnetic field He is set to form an angle of 105° relative to the light direction, while the maximum optical attenuation amount ER is set at 25 dB. Further, as the angle θp to be formed between the optical axes 2a, 3a of the polarizer 2 and analyzer 3, there is used an angle $\theta p_{opt}$ optimized based on the wavelength-dependency ΔATT of the optical attenuation amount shown in FIG. 5.

As understood from FIG. 11, there is established a point at which the Faraday rotation angle θf becomes 0°, since the angle formed by the variable magnetic field He relative to the light direction is set at 105° in this variable optical attenuator. Concretely, the Faraday rotation angle θf becomes 0° when the applied electric current I is set near approximately 40 mA, so that the wavelength-dependency Δθf becomes the minimum. In this way, it is understood that the wavelength-dependency ΔATT of the optical attenuation amount once becomes the minimum when the applied electric current I is set near approximately 40 mA as shown in FIG. 12. Further, since the angle to be formed between the optical axes 2a, 3a of the polarizer 2 and analyzer 3 is set at $\theta p_{opt}$, the situation of the maximum optical attenuation amount is realized when the applied electric current I is set near approximately 60 mA. The Faraday rotation angle $\theta_{ATTmax}$ under this condition is a negative value on the order of −7°, as read out from FIG. 11.

Generally, variable optical attenuators have usable ranges over which optical attenuation amounts of the attenuators monotonously increase (or monotonously decrease). Thus, the range from 0 to about 60 mA of the applied electric current I corresponds to the usable range in an optical attenuation characteristic such as shown in FIG. 12. The wavelength-dependency ΔATT of the optical attenuation amount in such a usable range once becomes 0 dB near 40 mA of the applied electric current I at the middle of the usable range, while the wavelength-dependency ΔATT becomes approximately 0.26 dB at the maximum within this range. As compared to FIG. 5 where the maximum value of the wavelength-dependency ΔATT within the usable range was approximately 1.1 dB, it is understood that the wavelength-dependency is remarkably reduced in the variable optical attenuator of the present invention.

According to this embodiment as described above, the wavelength-dependency ΔATT of the optical attenuation amount can be reduced by optimizing the arrangement of the optical axes 2a, 3a of the polarizer 2 and analyzer 3 in view of the wavelength-dependency Δθf of the Faraday rotation angle θf. In addition, the due definition of the fixed magnetic field Hp and variable magnetic field He relative to the light direction enables the Faraday rotation angle θf to become 0°. Further, the condition where the Faraday rotation angle θf becomes 0°, is realized within a range through which the optical attenuation amount is monotonously varied from 0 to the maximum value. This enables smaller wavelength-dependencies ΔATT of the optical attenuation amounts throughout the usable range of the variable optical attenuator. It will be useful to constitute various optical transmission systems, making use of such a variable optical attenuator having the reduced wavelength-dependency.

In the aforementioned embodiment, the optical axes 2a, 3a of the polarizer 2 and analyzer 3 have been optimized such that the Faraday rotation angle $\theta_{ATTmax}$, at which the wavelength-dependency of the optical attenuation amount becomes the maximum, is set at approximately 0°. However, the present invention is not limited thereto. Namely, it is possible to obtain the effect by virtue of the reduction of the wavelength-dependency of the optical attenuation amount by altering the arrangement of the optical axes 2a, 3a in a common basic constitution such that the Faraday rotation angle θΔTTmax is reduced even to a small extent.

For example, there will be now considered a situation where the angle θp formed between the polarizer 2 and analyzer 3 is changed from 105° (constitution of FIG. 2) to 100°, so that the Faraday rotation angle $\theta_{ATTmax}$ is brought closer to the 0° direction, only by 5°.

Figure 13:
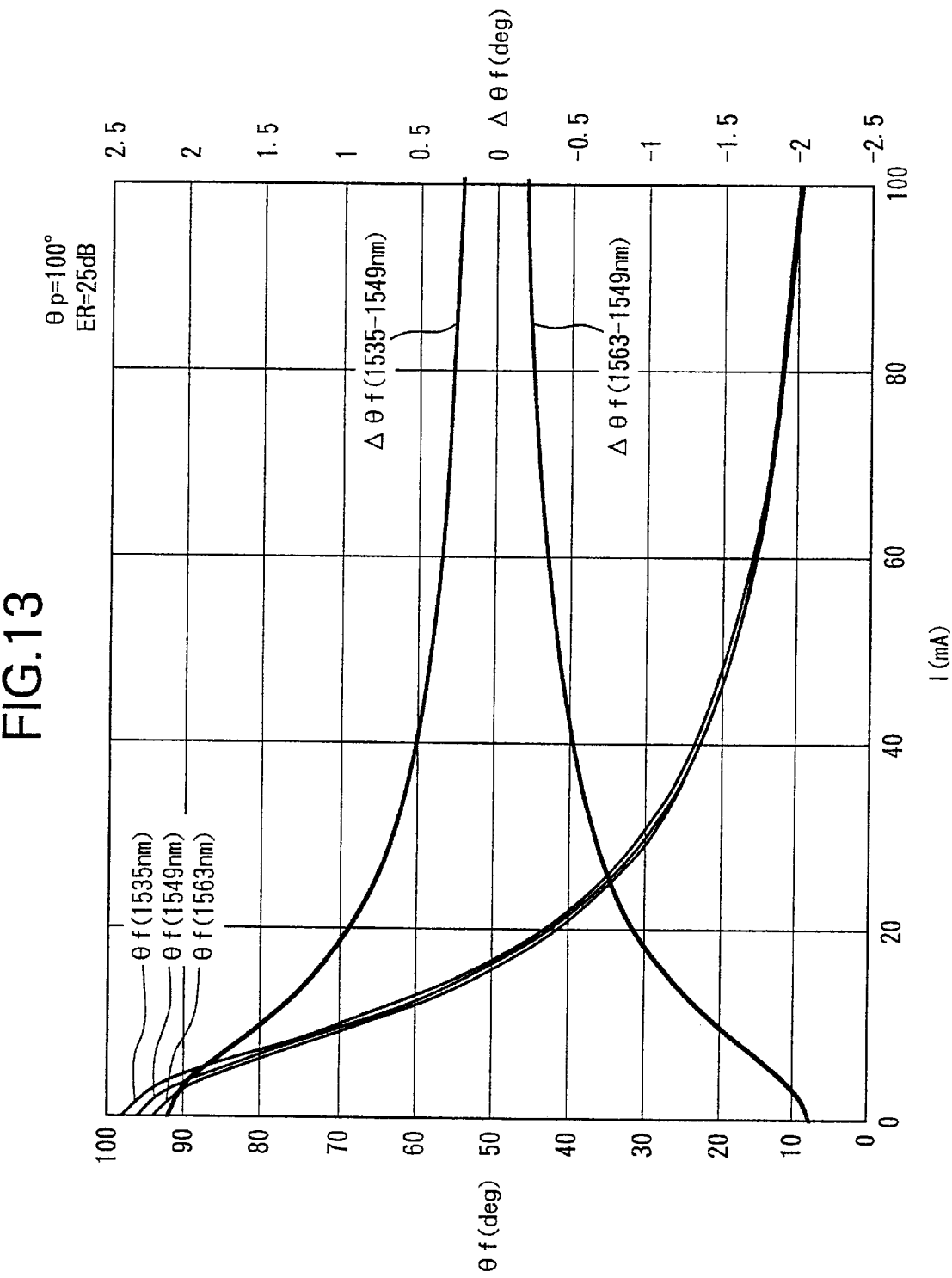
FIG. 13 is a view showing a calculational result between the Faraday rotation angle and the applied electric current where an angle θp is set at 100°, with reference to the embodiment of the present invention.
Figure 14:
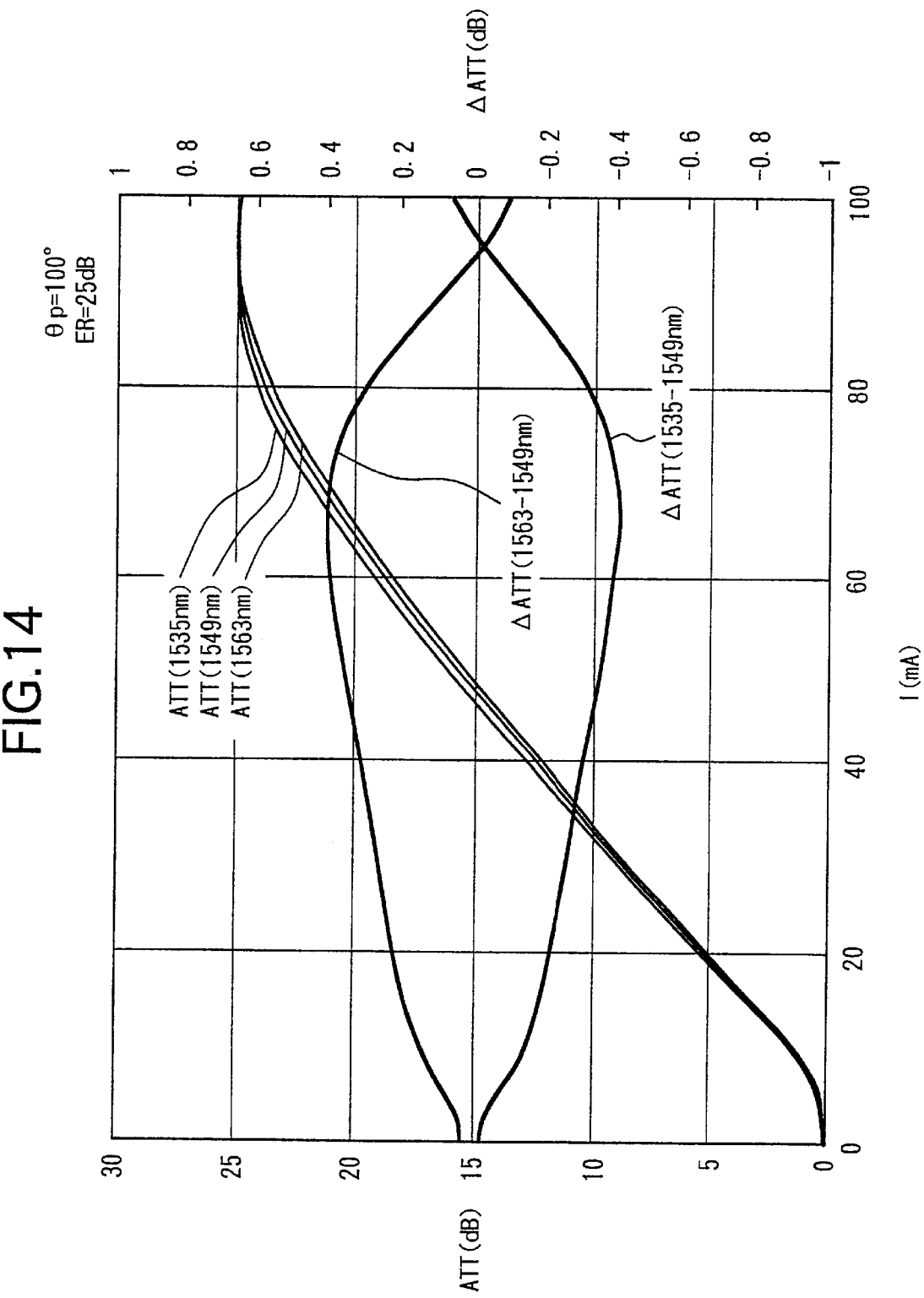
FIG. 14 is a view showing a calculational result of a relationship between an optical attenuation amount and the applied electric current, corresponding to FIG. 13.

FIG. 13 is a graph showing a calculational result of a relationship between the Faraday rotation angle θf and the applied electric current I in the above noted situation. Further, FIG. 14 is a graph showing a calculational result of a relationship between the optical attenuation amount ATT and the applied electric current 1, corresponding to FIG. 13, making use of the aforementioned equation (1).

As shown in FIG. 13, only by reducing the angle θp to 100°, the Faraday rotation angle $\theta_{ATTmax}$ can not be brought to be 0°. Nonetheless, the wavelength-dependency ΔATT of the optical attenuation amount within the usable range can be reduced to approximately 0.8 dB or less, as understood from FIG. 14.

Moreover, in the aforementioned embodiment, the light direction R, fixed magnetic field Hp and variable magnetic field He have been set to have the relationship shown in FIG. 9. However, the present invention is not limited thereto. For example, an adaptation such as shown in FIG. 15 or FIG. 16 is possible.

Figure 15:
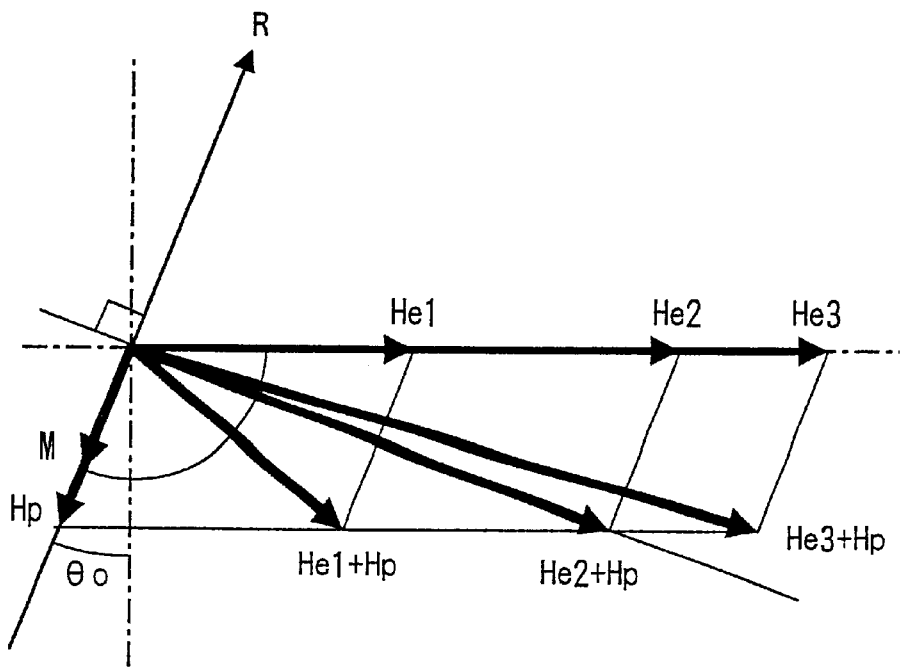
FIG. 15 is a view showing another relationship among light direction, fixed magnetic field and variable magnetic field, with reference to the embodiment of the present invention.

In the example of FIG. 15, the light direction R and fixed magnetic field Hp are inclined to the central axis (dashed line in this figure) of the Faraday rotator 1 by an angle θo°, while the variable magnetic field He is orthogonal to the central axis of the Faraday rotator 1. This type of relationship of the magnetic fields also results in that the synthesized magnetic field He2+Hp perpendicular to the light direction is applied to the Faraday rotator 1 and the light-directional component of the magnetization M becomes 0 and the Faraday rotation angle θf becomes 0°, when the magnitude of the variable magnetic field He becomes He2 similarly to the situation of FIG. 9.

Figure 16:
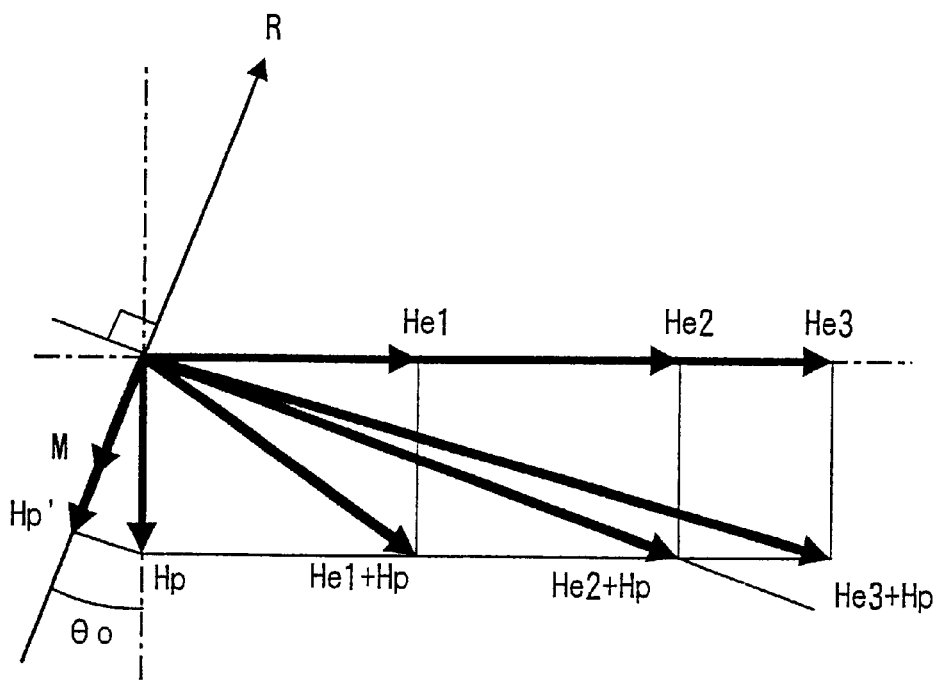
FIG. 16 is a view showing yet another relationship among light direction, fixed magnetic field and variable magnetic field, with reference to the embodiment of the present invention.

In the example of FIG. 16, the light direction R is inclined to the central axis (dashed line in this figure) of the Faraday rotator 1 by an angle θo°, the fixed magnetic field Hp is parallel to the central axis of the Faraday rotator 1, and the variable magnetic field He is orthogonal to the central axis of the Faraday rotator 1. Namely, this is an example illustrating that the fixed magnetic field Hp is not necessarily inclined when the light direction R is inclined by an angle θo°. This proves that the fixed magnetic field Hp need not be inclined when the light-directional component Hp' of the fixed magnetic field Hp is large enough to saturate the magnetization of the Faraday rotator 1, since the Faraday rotation angle θf is determined by the magnitude itself of the magnetization in the light direction.

Those arrangements of the magnetic fields shown in FIGS. 9, 15 and 16 can be appropriately selected in view of respective features thereof upon bringing the variable optical attenuators of the present invention into devices. Concretely, it is noted that the method for inclining the light direction (FIGS. 15 and 16) does mean inclination of input and output optical fibers, leading to a possibility of difficulty in implementing the variable optical attenuator as a device. Further, the method for inclining the variable magnetic field He relative to the Faraday rotator 1 requires that the configuration of the yoke, for example, is devised to optimally and inclinedly apply the magnetic field of the electromagnet 13 to the Faraday rotator 1. Note, it may be necessary to take such measures to adopt a larger yoke, which problematically results in a larger device. Further, the method for inclining the light direction only (FIG. 16) enables the variable optical attenuator to be implemented as a device making use of a permanent magnet such as not in the ring shape shown in FIG. 10 but in the solid cylindrical or solid parallelepipedous shape. For example, since cylindrical permanent magnets generally have stable magnetic fields on the center lines thereof, the fixed magnetic field Hp can be readily stabilized by such permanent magnets, favorably leading to stabilized characteristics of the variable optical attenuator.

Further, although the angle θo has been set at 15° in the aforementioned embodiments, the present invention is not limited thereto. For example, there will be considered a situation where the angle θo is increased to 20° while keeping the remaining setting.

Figure 17:
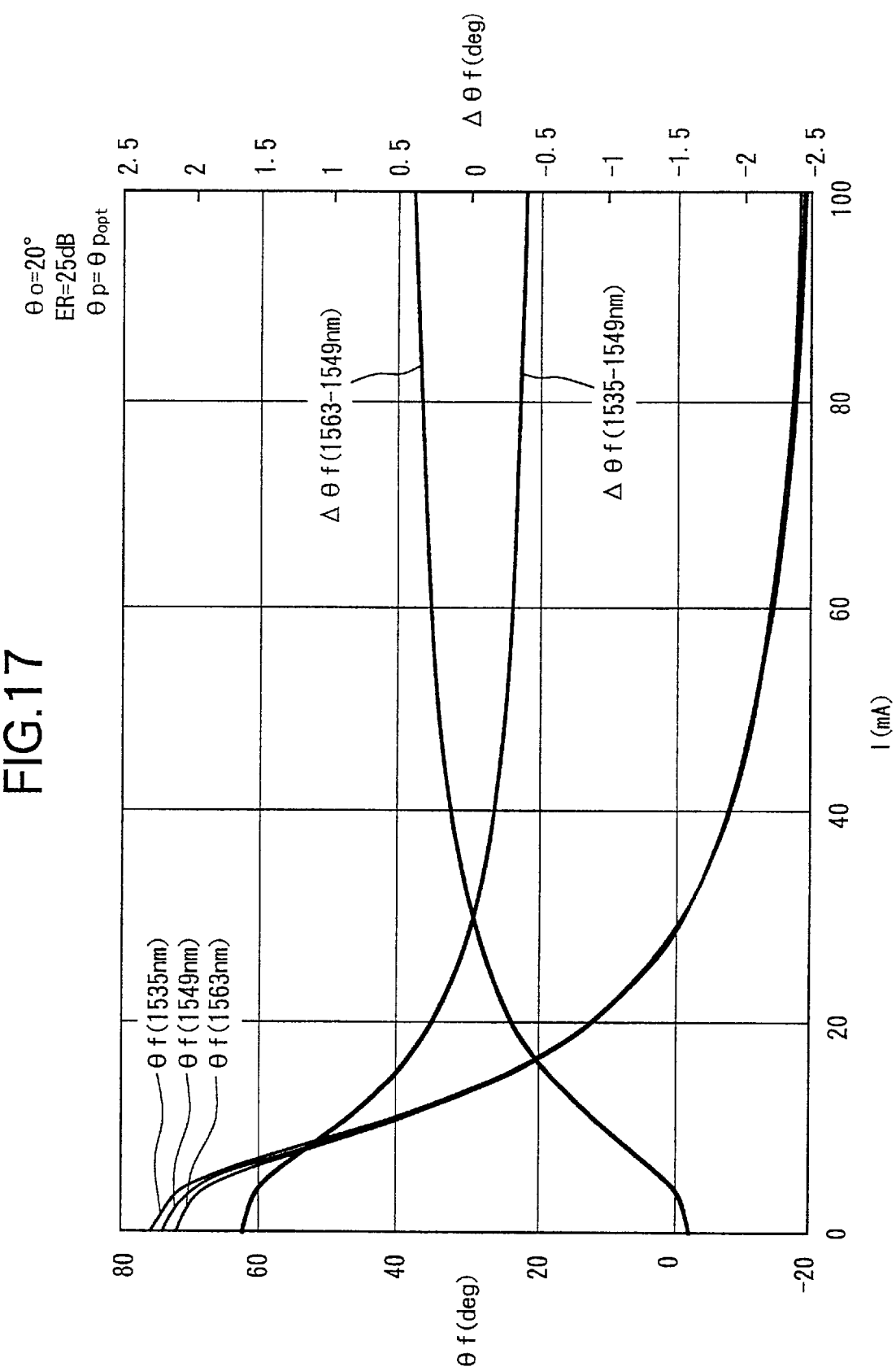
FIG. 17 is a view showing a calculational result between the Faraday rotation angle and the applied electric current where an angle θo is set at 20°, with reference to the embodiment of the present invention.

FIG. 17 is a graph showing a calculational result of a relationship between the Faraday rotation angle θf and the applied electric current I in the above noted situation. Further, FIG. 18 is a graph showing a calculational result of a relationship between the optical attenuation amount ATT and the applied electric current 1, corresponding to FIG. 17, making use of the aforementioned equation (1).

Figure 18:
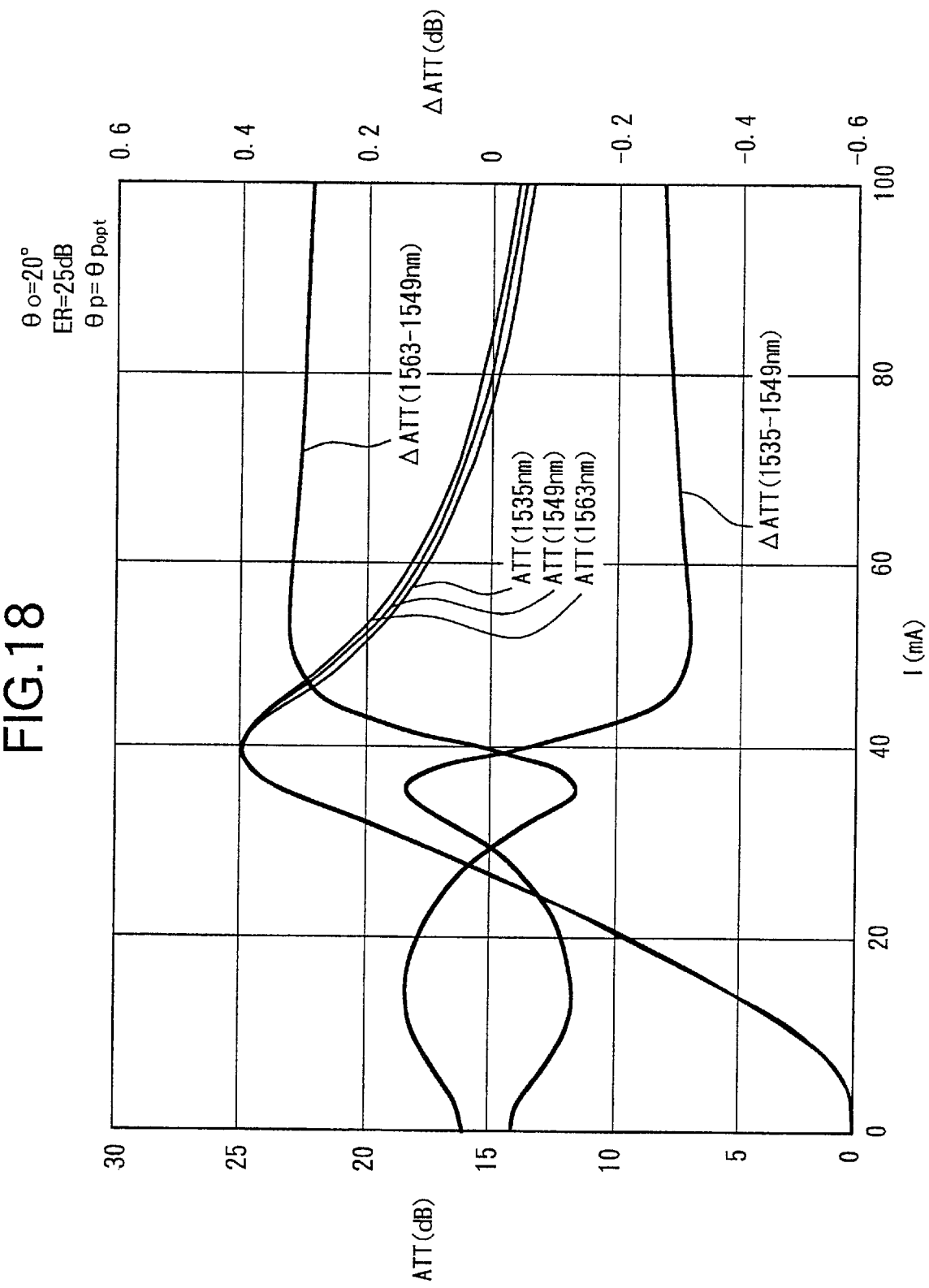
FIG. 18 is a view showing a calculational result of a relationship between the optical attenuation amount and the applied electric current, corresponding to FIG. 17.

As understood from FIG. 18, although the wavelength-dependency ΔATT of the optical attenuation amount at θo=20° is not so changed from that at θo=15°, the electric current value causing the maximum optical attenuation amount ATT is reduced from approximately 60 mA at θo=15° down to 40 mA at θo=20°. This means that the power consumption of the variable optical attenuator can be reduced, by setting the angle θo at a value as large as possible within a range where the precision required for the variable control of the optical attenuation amount ATT can be ensured.

Moreover, although situations where the maximum optical attenuation amount ER is set at 25 dB have been described, this setting can be arbitrarily selected. For example, there will be considered a situation where the maximum optical attenuation amount ER is set at 30 dB, while keeping the remaining setting.

Figure 19:
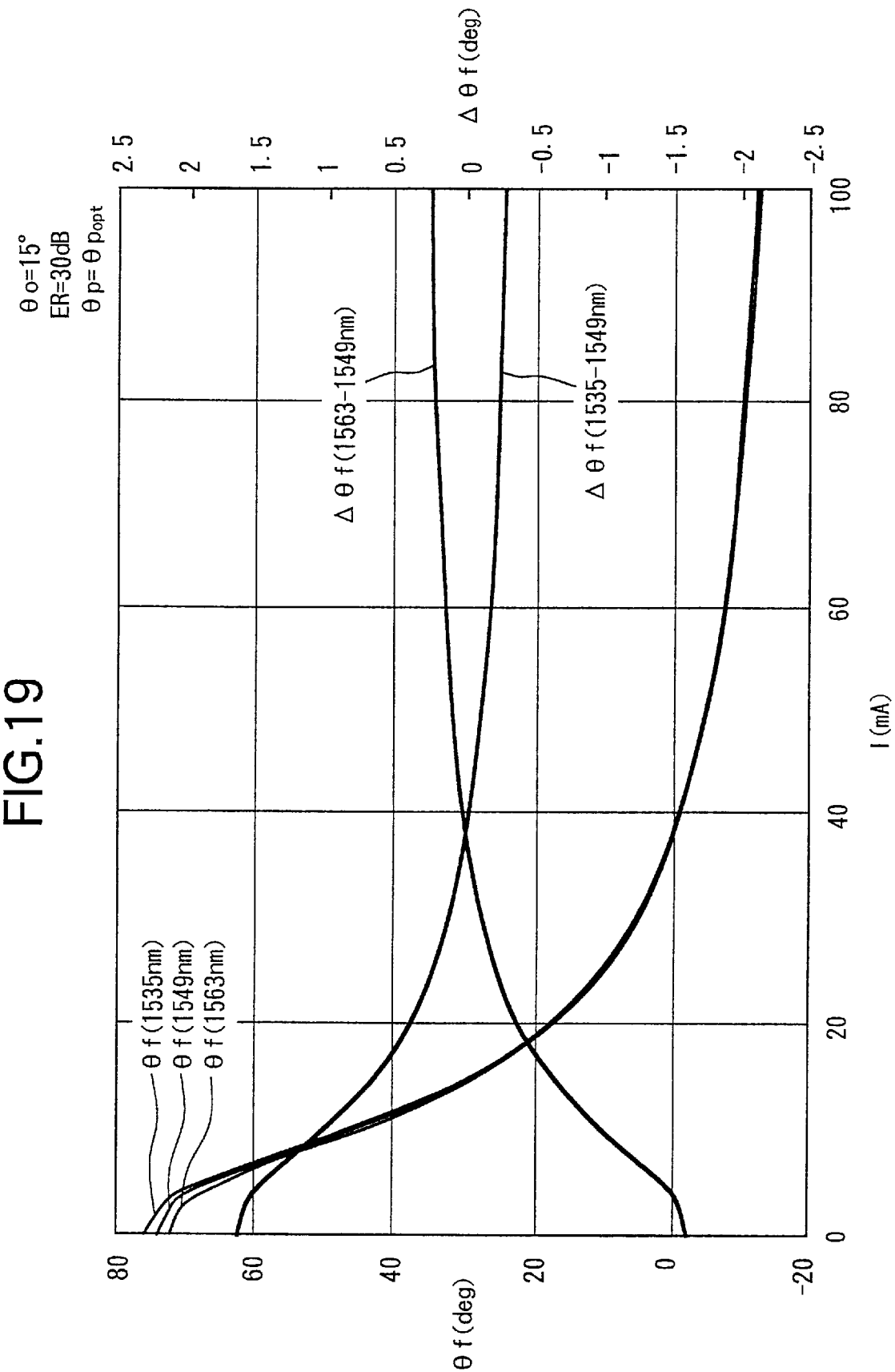
FIG. 19 is a view showing a calculational result between the Faraday rotation angle and the applied electric current, where the maximum optical attenuation amount ER is set at 30 dB, with reference to the embodiment of the present invention.

FIG. 19 is a graph showing a calculational result of a relationship between the Faraday rotation angle θf and the applied electric current I in the above noted situation. Further, FIG. 20 is a graph showing a calculational result of a relationship between the optical attenuation amount ATT and the applied electric current 1, corresponding to FIG. 19, making use of the aforementioned equation (1).

Figure 20:
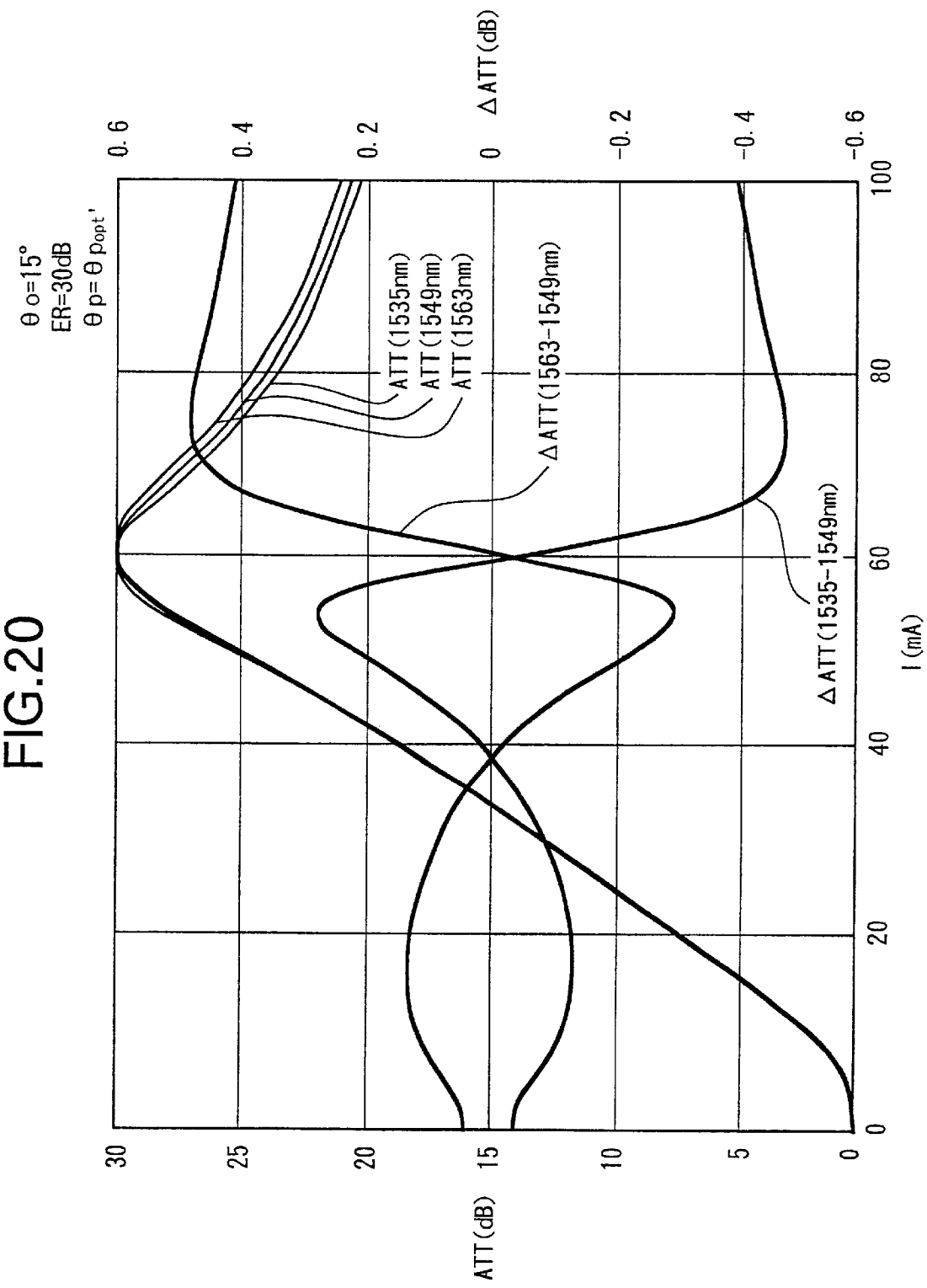
FIG. 20 is a view showing a calculational result between the optical attenuation amount and the applied electric current, corresponding to FIG. 19.

As understood from FIG. 20, the maximum value of the wavelength-dependency ΔATT, where the maximum optical attenuation amount ER is set at ER=30 dB, is approximately 0.57 dB which is larger than the maximum value of the wavelength-dependency ΔATT where the maximum optical attenuation amount ER is set at ER=25 dB (FIG. 12). Nonetheless, the thus increased wavelength-dependency ΔATT can be reduced by again optimizing the optimized angle θp$_{opt}$. Concretely, the increased wavelength-dependency ΔATT of the optical attenuation amount with the increased ER can be reduced by increasing the once optimized angle θp$_{opt}$ by a few degrees.

Figure 21:
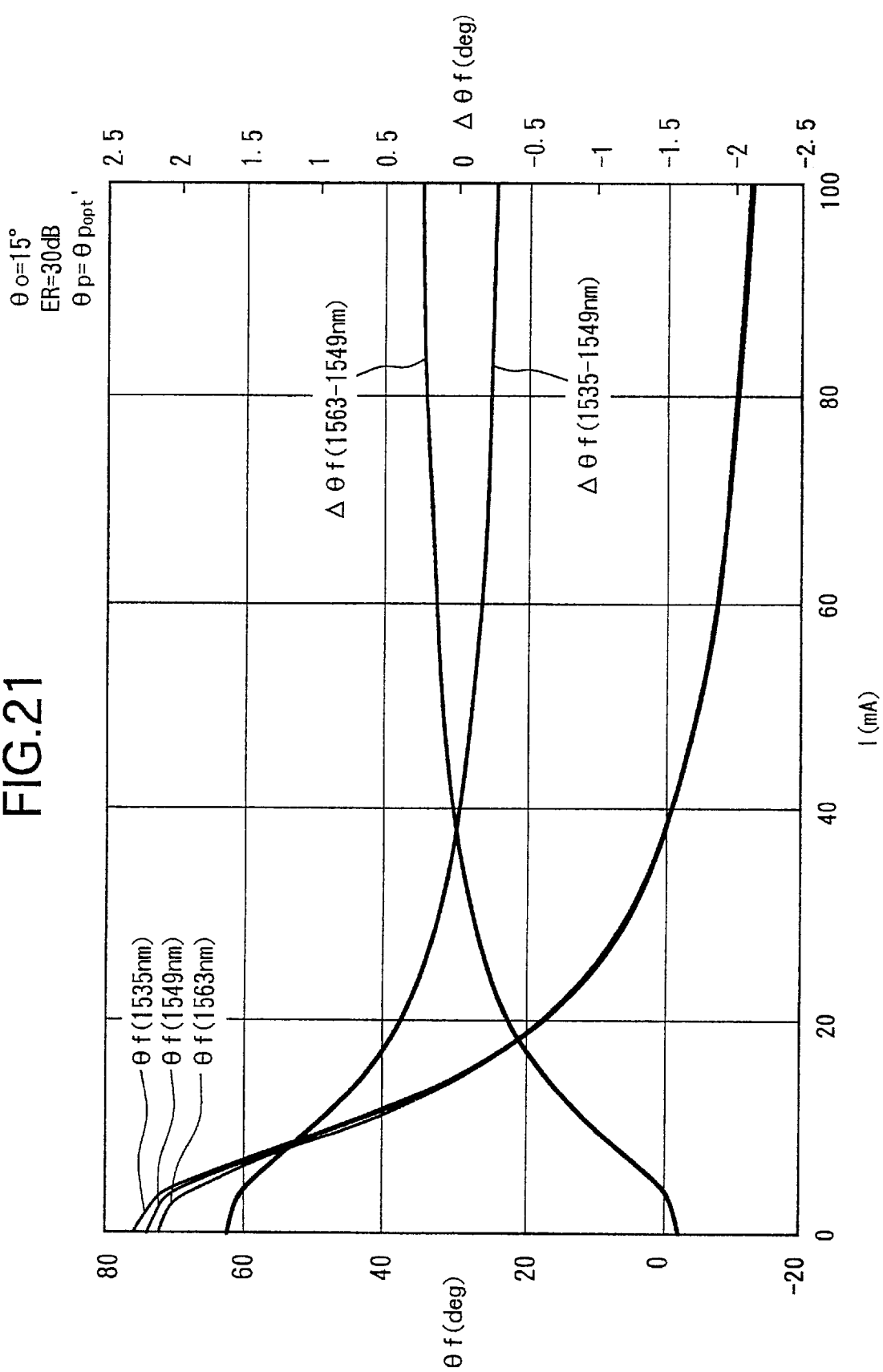
FIG. 21 is a view showing a calculational result between the Faraday rotation angle and the applied electric current, where the maximum optical attenuation amount ER is set at 30 dB to thereby again optimize an angle θp$_{opt}$, with reference to the embodiment of the present invention.
Figure 22:
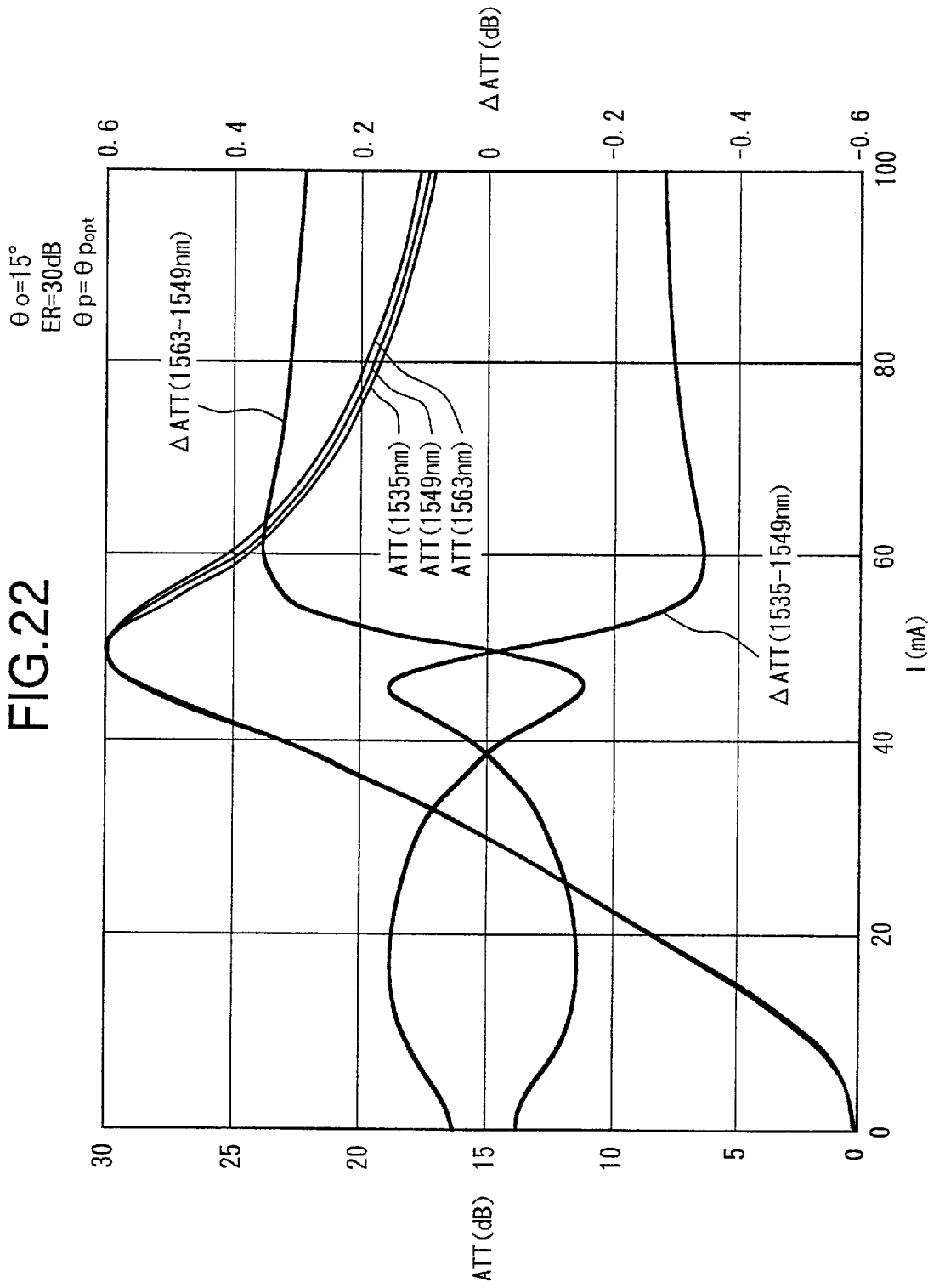
FIG. 22 is a view showing a calculational result between the optical attenuation amount and the applied electric current, corresponding to FIG. 21.
Figure 23:
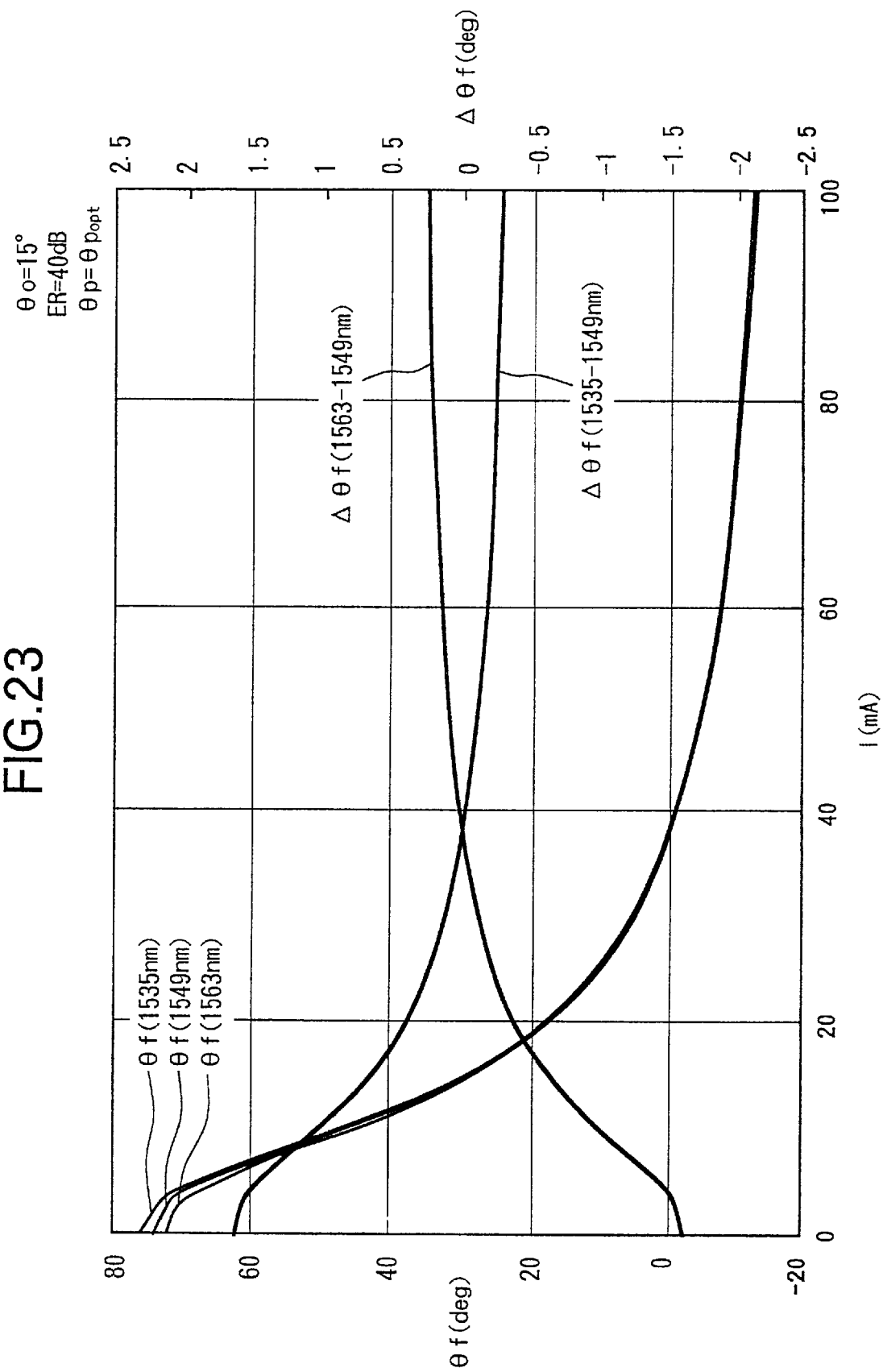
FIG. 23 is a view showing a calculational result between the Faraday rotation angle and the applied electric current, where the maximum optical attenuation amount ER is set at 40 dB to thereby again optimize the angle θp$_{opt}$, with reference to the embodiment of the present invention.
Figure 24:
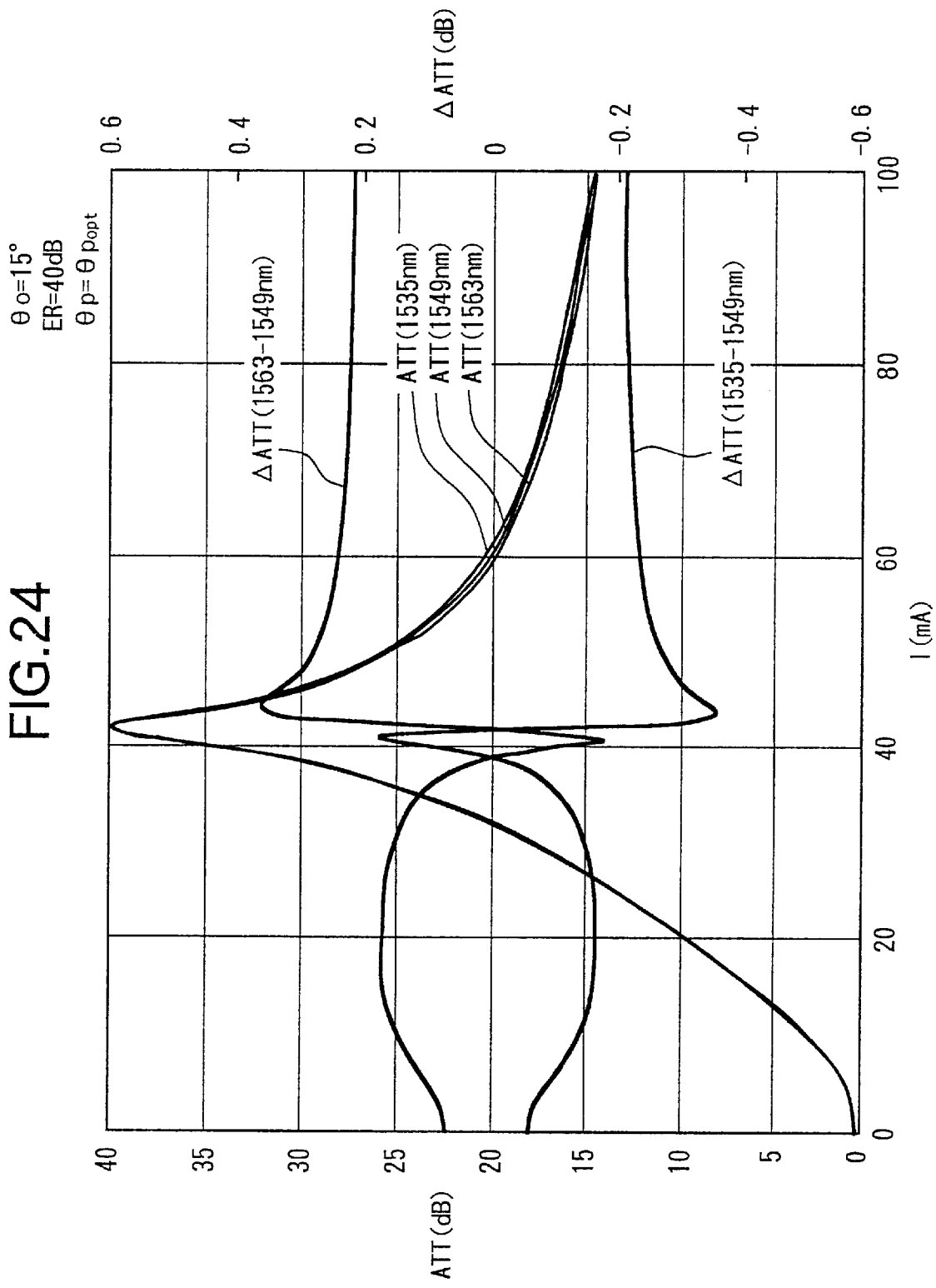
FIG. 24 is a view showing a calculational result between the optical attenuation amount and the applied electric current, corresponding to FIG. 23.

FIGS. 21 and 22 are graphs showing characteristics where ER is set at ER=30 dB and the once optimized angle θp$_{opt}$ is again optimized. Also, FIGS. 23 and 24 are graphs showing characteristics where ER is set at ER=40 dB and the once optimized angle θp$_{opt}$ is again optimized. As understood from these figures, even when the setting of the maximum optical attenuation amount ER is changed, the wavelength-dependency ΔATT of the optical attenuation amount can be sufficiently reduced by again optimizing, corresponding to the thus changed setting, the once optimized angle θp formed between the optical axes of the polarizer 2 and analyzer 3. However, it should be noted that larger maximum optical attenuation amounts ER tend to lead to larger wavelength-dependencies ΔATT of the optical attenuation amount. In this regard, the maximum values of the wavelength-dependencies ΔATT corresponding to the respective settings of the maximum optical attenuation amounts ER are, for example, 0.26 dB (ER=25 dB), 0.31 dB (ER=30 dB), and 0.34 dB (ER=40 dB).

Concerning the aforementioned tendency, there will be now briefly described a situation where the wavelength-dependency ΔATT of the optical attenuation amount need not be reduced throughout the whole range from 0 dB up to the maximum value ER of the optical attenuation amount ATT.

For example, there can be assumed such a situation that the maximum optical attenuation amount ER=40 dB is used for a shutdown function of an optical transmission device such as in emergency, whereas light level adjustments to be used in a normal operation are conducted at an optical attenuation amount on the order of 20 dB. In such a situation, the range to be considered for the wavelength-dependency ΔATT of the optical attenuation amount is between 0 dB and 20 dB, and the degree of the wavelength-dependency ΔATT upon shutdown of the optical transmission device does not matter. It may be thus useful to determine the range of the optical attenuation amount ATT as a variable optical attenuator, within which the wavelength-dependency ΔATT of the optical attenuation amount shall be considered.

Figure 25:
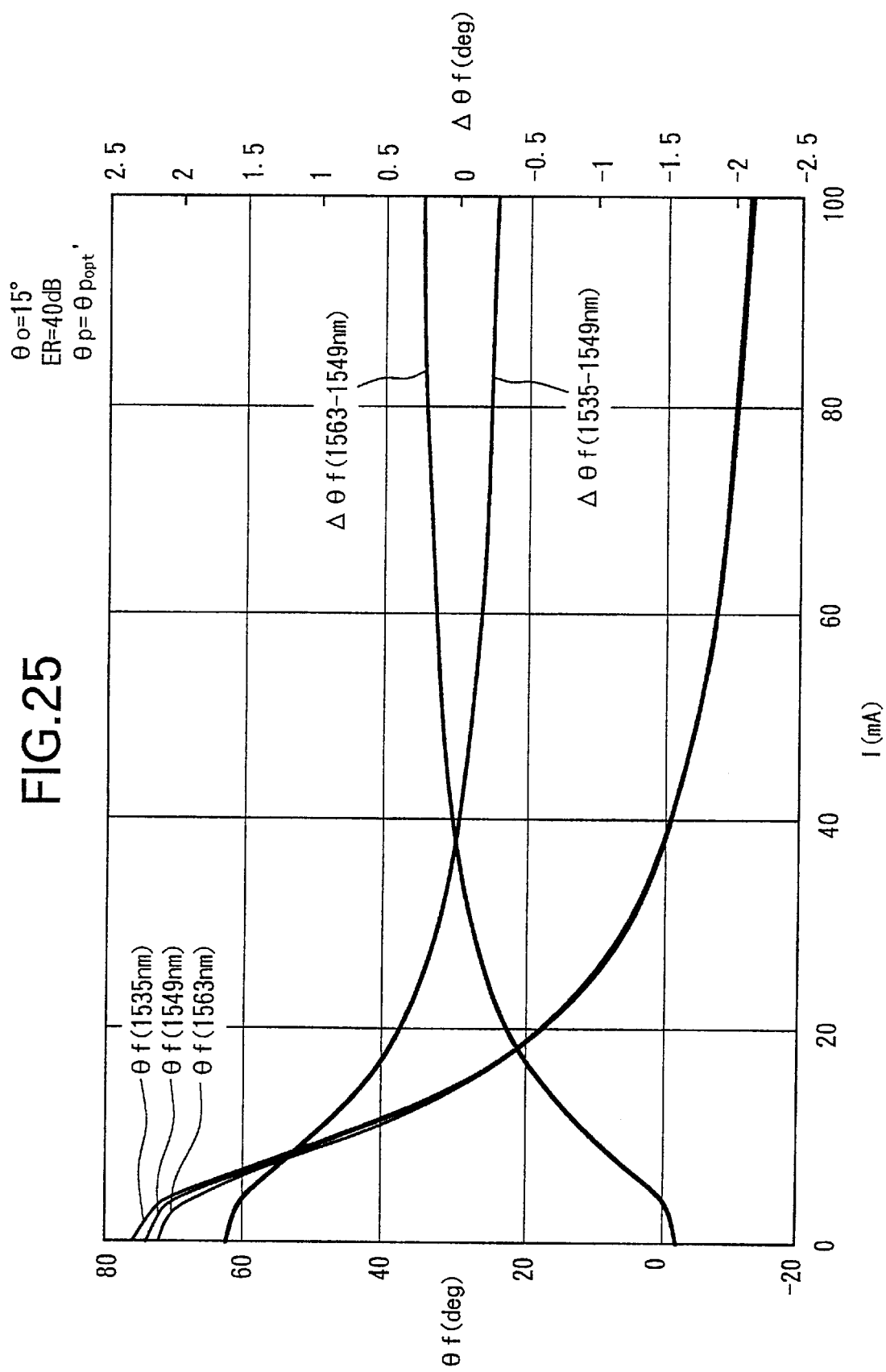
FIG. 25 is a view showing a calculational result between the Faraday rotation angle and the applied electric current where the wavelength-dependency is set to be reduced in a range of 0 to 20 dB of the optical attenuation amount.
Figure 26:
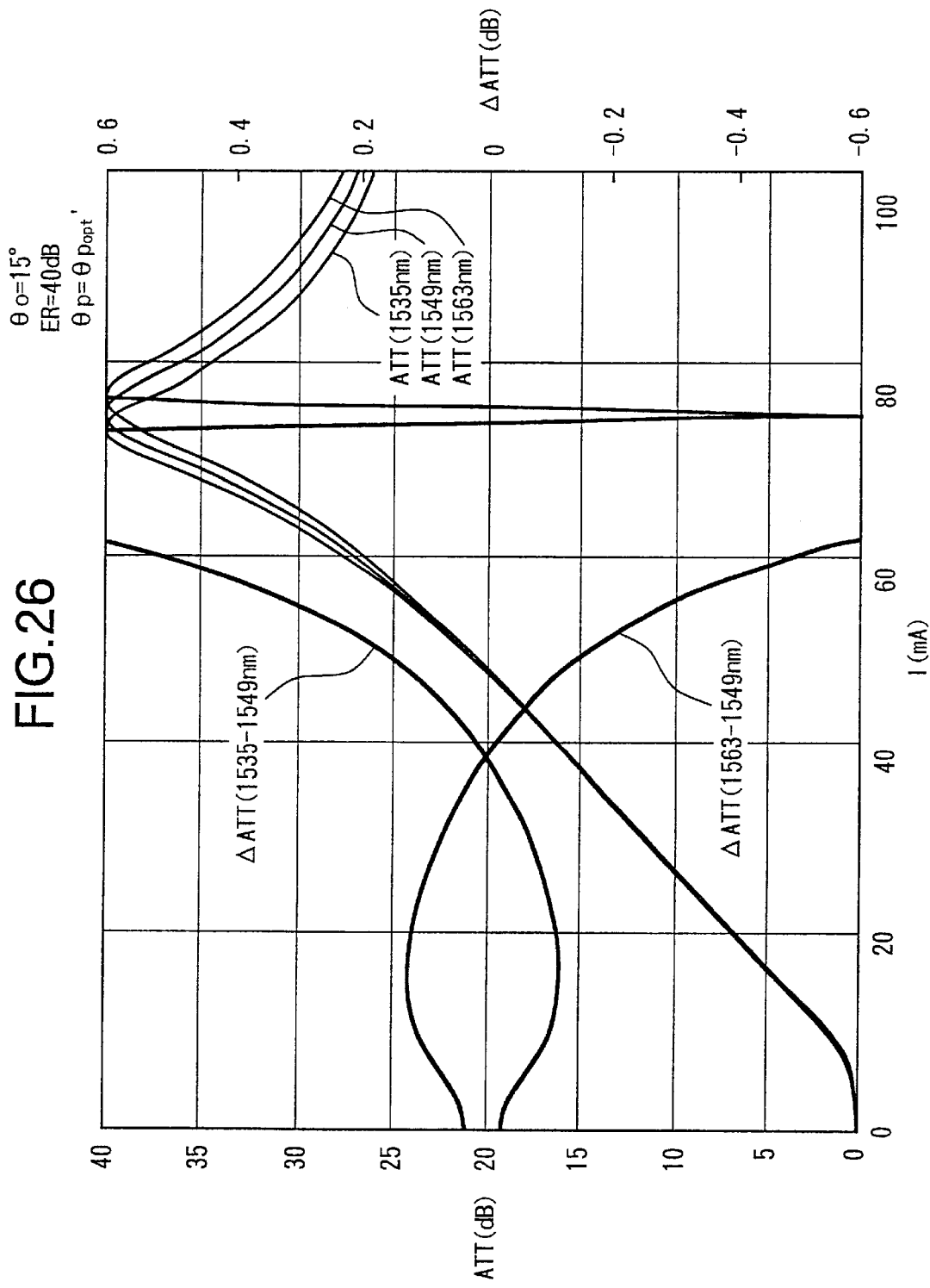
FIG. 26 is a view showing a calculational result between the optical attenuation amount and the applied electric current, corresponding to FIG. 25.

FIGS. 25 and 26 are graphs showing calculational results of the due characteristics, by restricting the reduction range of the wavelength-dependency of the optical attenuation amount to a range between 0 dB and 20 dB while maximum optical attenuation amount ER is set at ER=40 dB. As understood from FIG. 26, the maximum value of the wavelength-dependency ΔATT of the optical attenuation amount within the range, where the optical attenuation amount ATT is 20 dB or less, is approximately 0.24 dB, which means that the wavelength-dependency ΔATT is reduced as compared with the setting shown in FIG. 24.

What we claimed are:

1. A variable optical attenuator utilizing the Faraday effect, comprising:

a Faraday rotator for providing polarized light transmitted through said Faraday rotator with a variable Faraday rotation angle; and elements for extracting linearly polarized light arranged on a light axis in front of and behind said Faraday rotator, respectively, in which an optical attenuation amount of said variable optical attenuator is changed by a variation of the Faraday rotation angle, wherein an angle formed between the optical axis of one of said elements for extracting the linearly polarized light and the optical axis of the other of said elements is set such that the Faraday rotation angle, at which the wavelength-dependency of the optical attenuation amount of said variable optical attenuator becomes the maximum, is brought to be substantially 0°.

2. A variable optical attenuator utilizing the Faraday effect according to claim 1, further comprising:

magnetic field generating means for applying a fixed magnetic field and a variable magnetic field, directions of which are mutually different, to said Faraday rotator, wherein the Faraday rotation angle is settable at 0°, by setting the directions of said fixed magnetic field and said variable magnetic field so as to include such a state that the direction of a synthesized magnetic field cooperatively formed by said fixed magnetic field and said variable magnetic field becomes perpendicular to the light direction.

3. A variable optical attenuator utilizing the Faraday effect according to claim 2, wherein, when the direction of said fixed magnetic field is parallel to the light direction, the direction of said variable magnetic field forms an obtuse angle relative to the direction of said fixed magnetic field.

4. A variable optical attenuator utilizing the Faraday effect according to claim 2, wherein, when the direction of said fixed magnetic field is not parallel to the light direction, the direction of said variable magnetic field forms an obtuse angle relative to the light-directional component of said fixed magnetic field.

5. A variable optical attenuator utilizing the Faraday effect, comprising:

two pieces of polarizers for extracting polarized light, respectively;

a Faraday rotator disposed between said polarizers;

a first magnet for applying, a magnetic field thereof parallel to an axis of light passing through said Faraday rotator, to said Faraday rotator; and a second magnet having a magnetic field direction forming an obtuse angle relative to the magnetic field of said first magnet;

wherein the strength of the magnetic field of said second magnet is adjustable.

6. A variable optical attenuator utilizing the Faraday effect according to claim 5, wherein the direction of a synthesized magnetic field to be cooperatively formed by the magnetic fields of said first magnet and said second magnet can be brought to become perpendicular to said axis of light, by adjusting the strength of the magnetic field of said second magnet.

7. A variable optical attenuator comprising:

a Faraday rotator providing polarized light transmitted through said Faraday rotator with a variable Faraday rotation angle; and first and second optical elements extracting linearly polarized light arranged on a light axis and on opposite sides of said Faraday rotator, respectively, in which an optical attenuation amount of said variable optical attenuator is changed by a variation of the Faraday rotation angle, wherein an angle formed between the optical axis of the first optical element and the optical axis of the second optical element is set such that the Faraday rotation angle, at which the wavelength-dependency of the optical attenuation amount of said variable optical attenuator becomes the maximum, is 0°.

8. A variable optical attenuator according to claim 7, further comprising:

a magnetic field generating unit applying a fixed magnetic field and a variable magnetic field to said Faraday rotator, the fixed magnetic field and the variable magnetic field having directions that are mutually different, wherein the Faraday rotation angle is set at 0°, by setting the directions of said fixed magnetic field and said variable magnetic field so as to include such a state that the direction of a synthesized magnetic field cooperatively formed by said fixed magnetic field and said variable magnetic field becomes perpendicular to the direction of the linearly polarized light.

9. A variable optical attenuator according to claim 8, wherein, when the direction of said fixed magnetic field is parallel to the direction of the linearly polarized light, the direction of said variable magnetic field forms an obtuse angle relative to the direction of said fixed magnetic field.

10. A variable optical attenuator according to claim 8, wherein, when the direction of said fixed magnetic field is not parallel to the direction of the linearly polarized light, the direction of said variable magnetic field forms an obtuse angle relative to a light-directional component of said fixed magnetic field.

* * * * *

UNITED STATES PATENT AND TRADEMARK OFFICE
CERTIFICATE OF CORRECTION

PATENT NO.    : 6,384,957 B1
DATED         : May 7, 2002
INVENTOR(S)   : Seiichi Ikeda et al.

It is certified that error appears in the above-identified patent and that said Letters Patent is hereby corrected as shown below:

<u>Title page,</u>
Item [30], Foreign Application Priority Data, please change "12-058815" to -- 2000-058815 --.

Signed and Sealed this

Twenty-third Day of July, 2002

*Attest:*

*Attesting Officer*

JAMES E. ROGAN
*Director of the United States Patent and Trademark Office*